US012597312B2

(12) United States Patent
Rodriguez et al.

(10) Patent No.: US 12,597,312 B2
(45) Date of Patent: Apr. 7, 2026

(54) ELECTRONIC GAMING MACHINE DISPLAY UNIT WITH AN INTEGRATED SPEAKER TRANSDUCER FOR FORMING A DIRECTIONAL SPEAKER CONE

(71) Applicant: Aristocrat Technologies, Inc., Las Vegas, NV (US)

(72) Inventors: Frank Rodriguez, Las Vegas, NV (US); Stephen Shaffer, Jr., Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 260 days.

(21) Appl. No.: 18/127,534

(22) Filed: Mar. 28, 2023

(65) Prior Publication Data

US 2023/0316852 A1 Oct. 5, 2023

Related U.S. Application Data

(60) Provisional application No. 63/326,225, filed on Mar. 31, 2022.

(51) Int. Cl.

*G07F 17/32* (2006.01)
*H04R 1/02* (2006.01)
*H04R 1/40* (2006.01)

(52) U.S. Cl.

CPC ...... *G07F 17/3213* (2013.01); *G07F 17/3209* (2013.01); *G07F 17/3216* (2013.01); *H04R 1/025* (2013.01); *H04R 1/403* (2013.01); *H04R 2201/40* (2013.01)

(58) Field of Classification Search

None

See application file for complete search history.

(56) References Cited

U.S. PATENT DOCUMENTS

| | | | | |
|---|---|---|---|---|
| 7,050,600 | B2 * | 5/2006 | Saiki | H04R 1/028 381/186 |
| 7,120,264 | B2 | 10/2006 | Saiki | |
| 8,934,228 | B2 | 1/2015 | Franklin | |
| 10,542,366 | B1 * | 1/2020 | Oates, III | H04R 5/02 |
| 11,064,300 | B2 * | 7/2021 | Kim | H04R 17/00 |
| 12,231,835 | B2 * | 2/2025 | Hockman | H04R 1/025 |
| 2001/0022835 | A1 * | 9/2001 | Matsuo | H04S 7/302 379/1.01 |
| 2004/0038722 | A1 * | 2/2004 | Gauselmann | G07F 17/32 463/16 |
| 2005/0105748 | A1 | 5/2005 | Bartell | |
| 2021/0158650 | A1 * | 5/2021 | Russ | G07F 17/34 |

* cited by examiner

*Primary Examiner* — Sunit Pandya

(74) *Attorney, Agent, or Firm* — Weaver Austin Villeneuve & Sampson LLP

(57) ABSTRACT

Disclosed are gaming systems, methods, and machines that include a display unit for a sound directed immersive gaming experiences. In some examples, the display unit may include a liquid crystal display (LCD) screen acting as the speaker cone through one or more sound systems. An LCD screen may have one or more speaker transducers integrated to generate and amplify one or more audible sound waves from one or more sound signals in a directional speaker cone.

20 Claims, 25 Drawing Sheets

ELECTRONIC GAMING MACHINE DISPLAY UNIT WITH AN INTEGRATED SPEAKER TRANSDUCER FOR FORMING A DIRECTIONAL SPEAKER CONE

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Because typical EGM displays or screens provide only a visual output, it is often necessary to add separate audio output hardware that consumes display or screen space. In EGMs, space saving solutions do not exist to minimize or eliminate the space taken up by the various other space-consuming components employed on EGMs (e.g., card readers, button decks, etc.). Fitting space-consuming components, like card readers and other components, in the cabinet has become exceedingly difficult due to positioning and configuring audio output/speaker systems to achieve near-theater quality sound. Existing audio output elements can add to the size and bulk of the EGM.

SUMMARY

This disclosure relates generally to gaming systems, methods, and machines. In particular, electronic gaming machines (EGMs) may include a display including a front display surface and rear surface. In particular, there may be one or more transducers behind the front display surface and configured to vibrate the screen to generate at least one mechanical sound wave.

DETAILED DESCRIPTION

Disclosed are systems and methods for gaming systems, methods, and machines that include a screen, such as a liquid crystal display (LCD) screen, acting as the speaker cone. For example, an LCD screen may have one or more speaker transducers behind controlled by one or more sound signals. The corresponding one or more sound signals may be independent of one another. Because LCD screens provide only a visual output, it is often to add a separate audio output device where sound is necessary. In EGMs, the desire for space saving solutions is exacerbated given the various components involved (card readers, button decks, etc.). It can be cumbersome to fit card readers and other components in the cabinet with external audio output/speaker systems. By locating speakers behind the screen, more cabinet real estate is available and improved visual and sound experience is achievable. The additional audio output elements add to the size and bulk of the unit. Thus, there is a need to add audio output to a visual output display without adding excessive size to the unit overall.

Further, some display choices, such as organic light emitting diode (OLED) screen can burn images into the screen. EGM screens are often "on" for long periods of time. Thus, burn-in issues are more prevalent. Screens with less burn-in issues are often harder to incorporate speakers in them due to the material layers. Thus, in another aspect, there may be a desire to add audio output to a visual output display with minimized burn-in issues and minimized added bulk.

In addition, separate audio output systems do not provide immersive experiences for EGM users. A user can have a more immersive experience where sound and image are able to "move" across a screen together. The mathematical model describing the loudness of orientated sound is called a sound cone. A sound with an orientation (a sound cone) is loudest in the direction of the orientation. This is different from sound with no orientation, which has a constant amplitude at a given distance in all directions. A sound cone can target sound in a particular direction so that a user can experience an individualized immersive experience without interrupting other nearby individuals. Thus, there is a need for a directional sound cone through a screen to improve immersive game experience.

Figure 1:
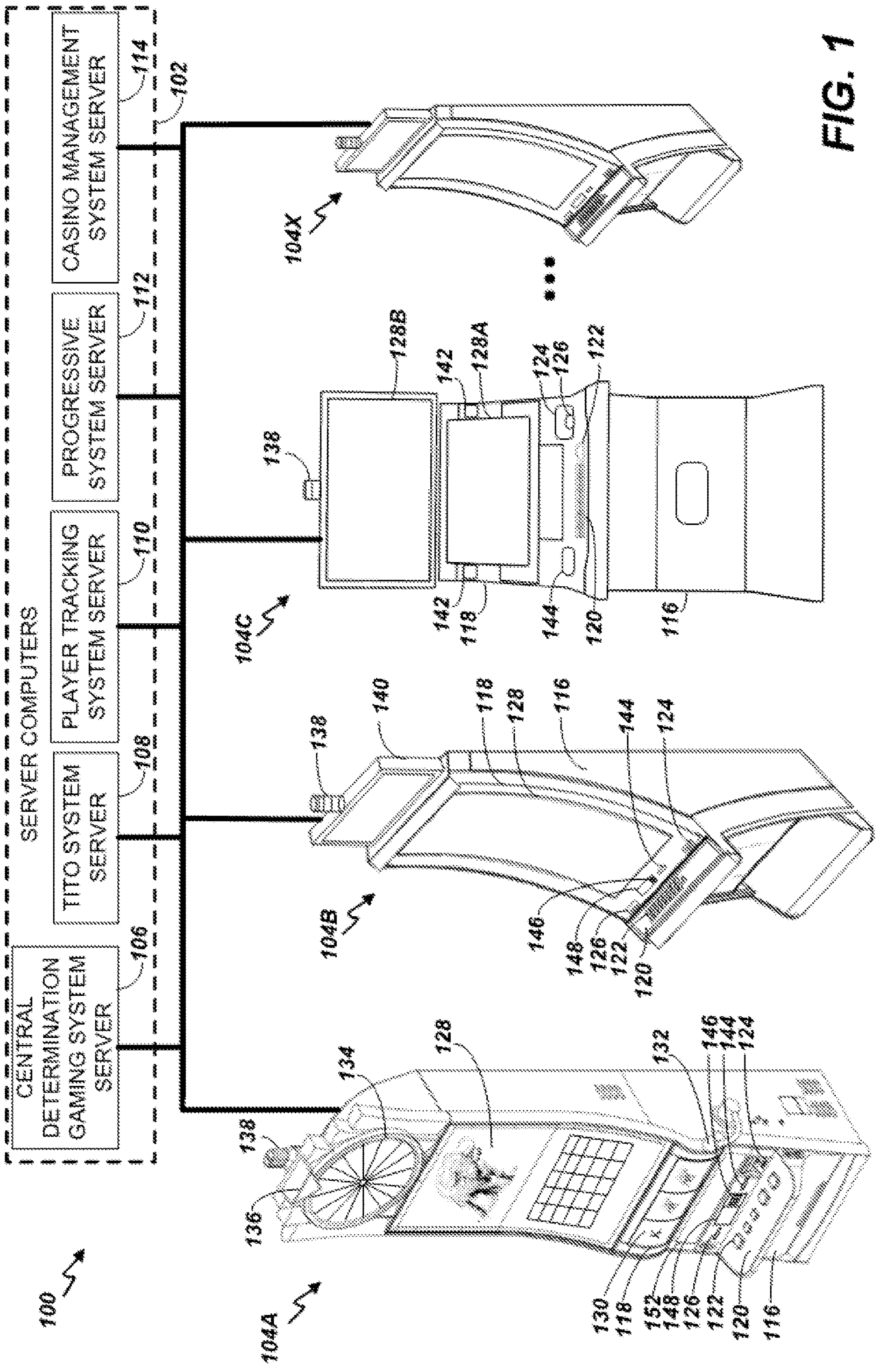
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) screen which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
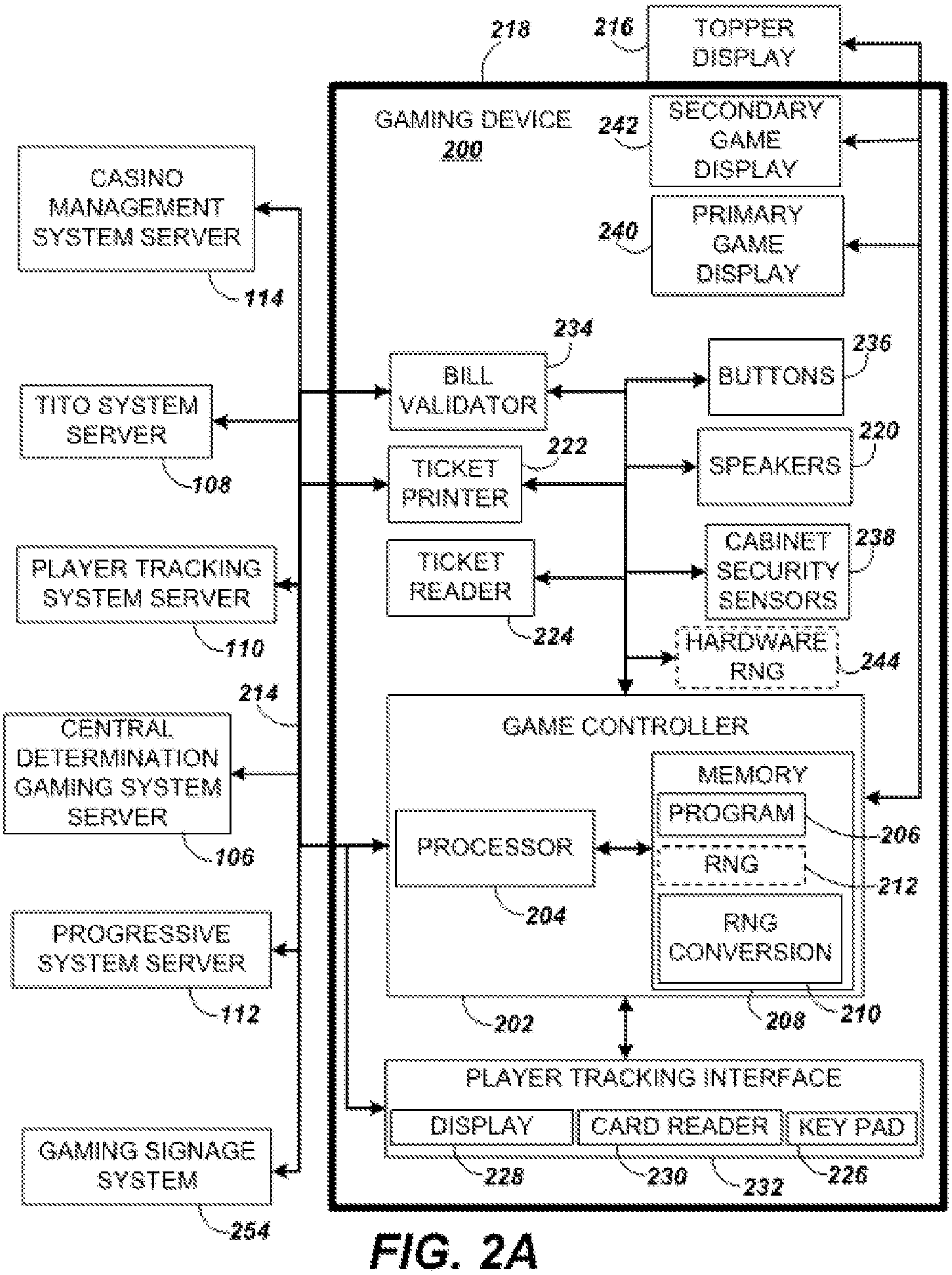
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
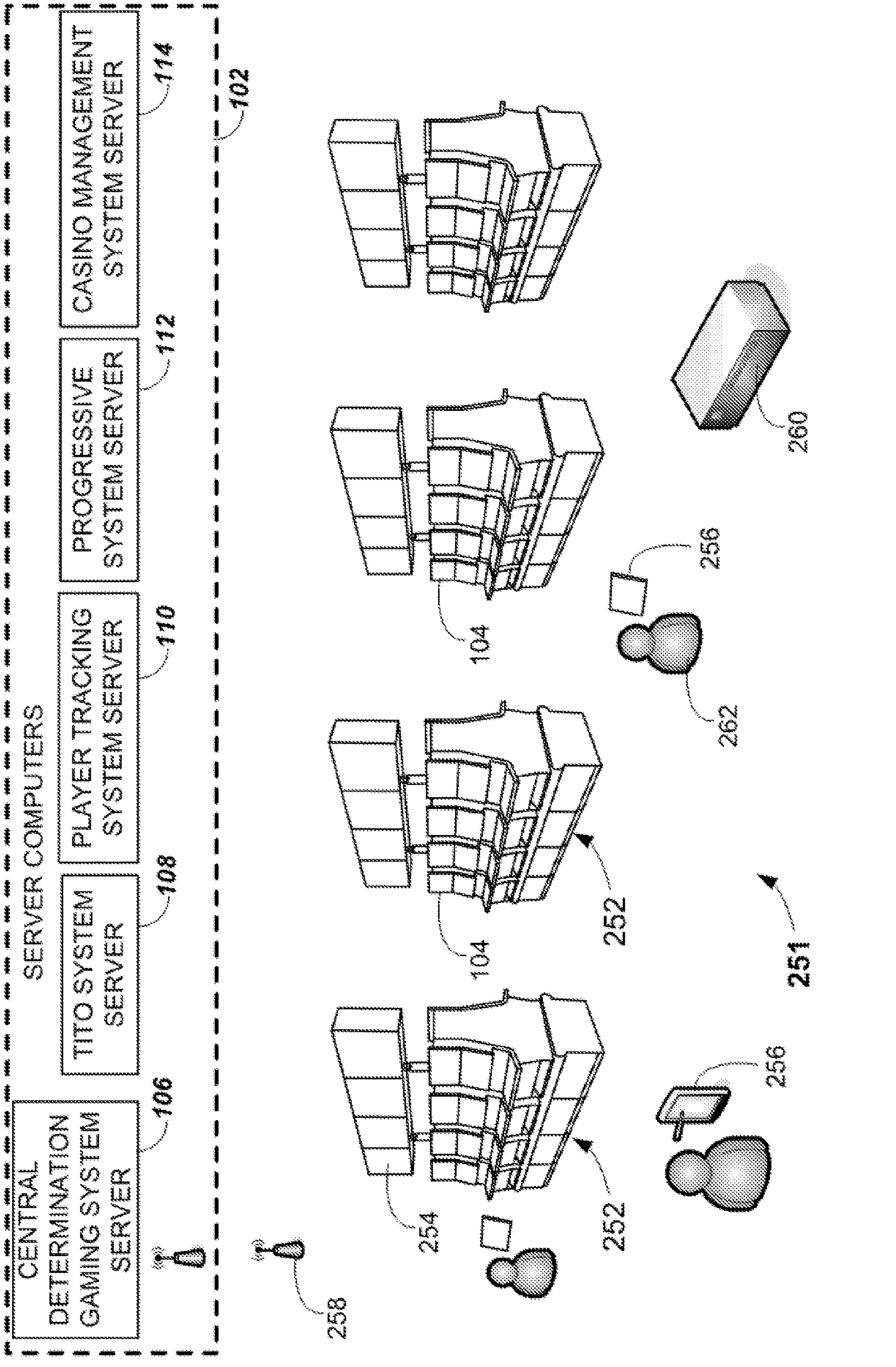
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
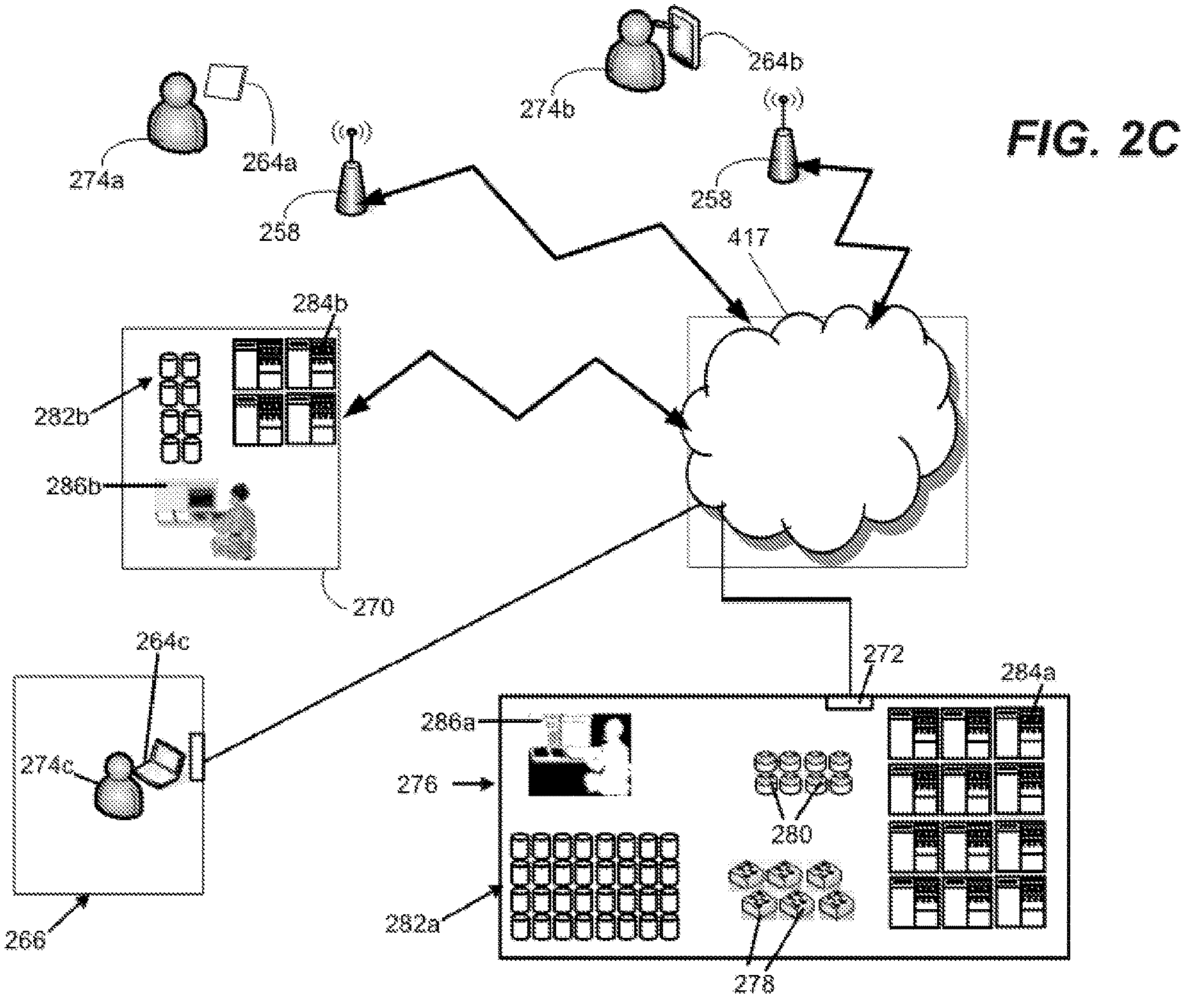
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
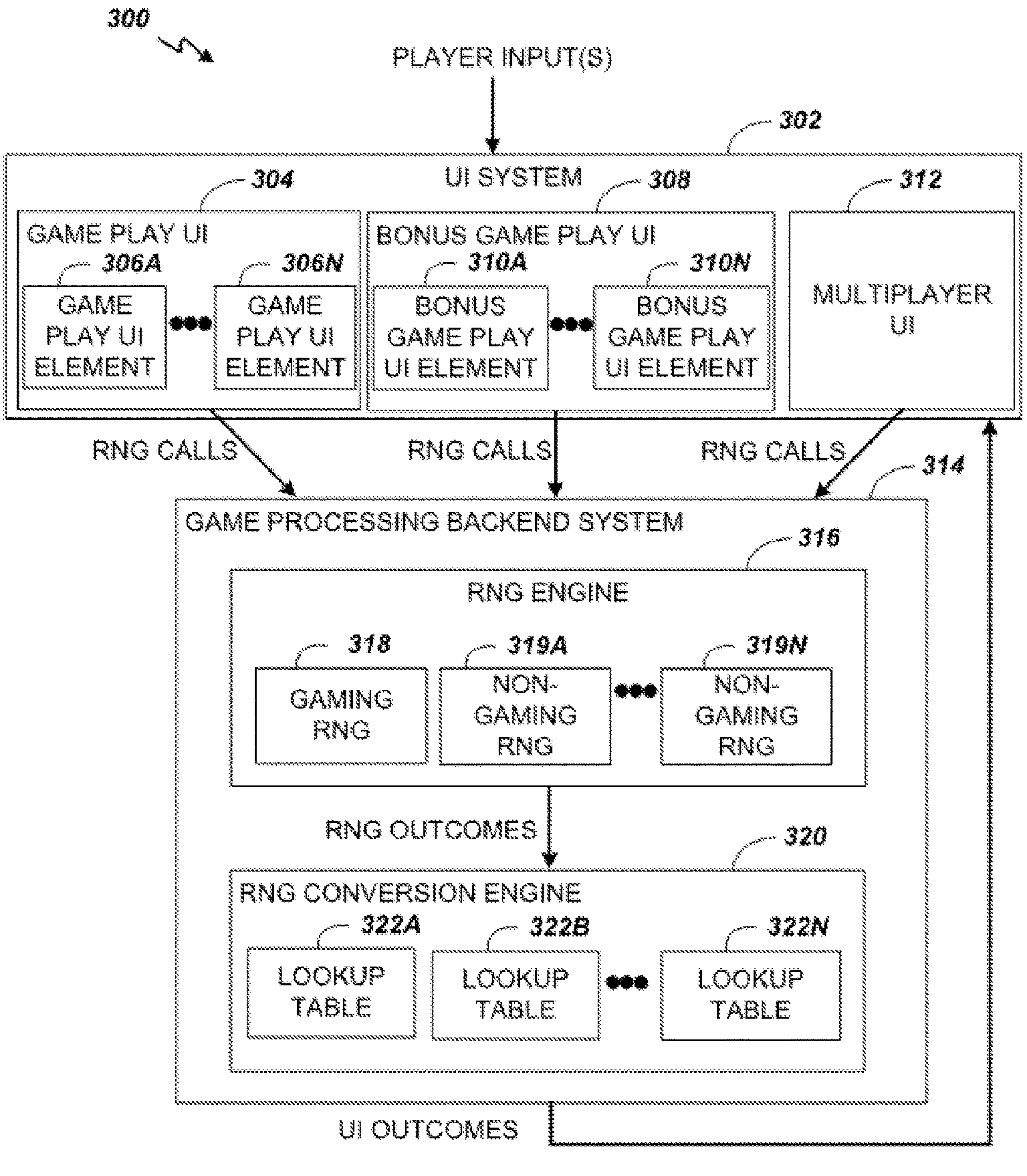
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-

306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
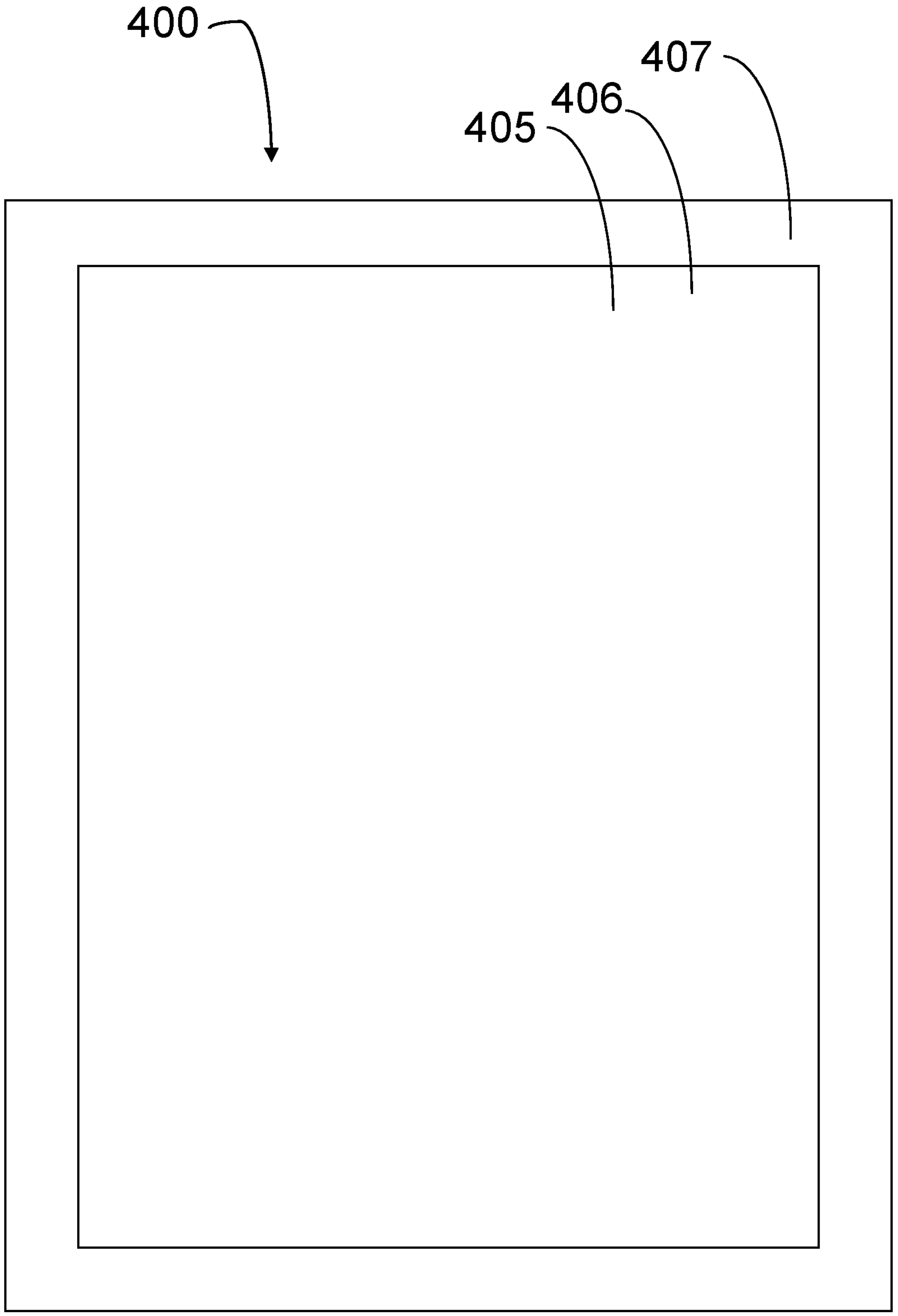
FIG. 4A depicts the front of a screen.

FIG. 4A illustrates an example electronic gaming machine display unit (EGM display unit) 400 having a screen 405, a front display surface 406, and a bezel 407 surrounding the screen 405. The screen 405 may serve a dual purpose of (1) displaying an image or a series of images from the front display surface 406 and (2) acting as a speaker cone to amplify sound. The speaker cone may function directionally (aimed at a particular directional field) or non-directionally (spreading naturally according to traditional sound engineering principles).

The screen 405 may be a display glass, plastic, or some other transparent or semi-transparent material. The screen 405 may include various layers of coatings, may have deposits of pixels, and may be made of a flexible material to accommodate various screen shapes. The screen 405 may be of a form suitable to be an OLED screen, an LCD screen, a plasma display panel (PDP) screen, or any type of video display screen. The EGM display unit 400 may be configured to generate a visual display. The EGM display unit 400 may be a projection screen on which images may be displayed.

For example, an LCD screen may be employed in an EGM due to its low power consumption, thinness vibrant color display capabilities, and lower likelihood of burn-in issues as compared to other displays, for example, an OLED screen or plasma screen. The LCD screen may have the following layers: print circuit board, back light unit, color filter, polarizer, glass front display surface, and frame. In this example, the front display surface may be plastic or any other transparent material. The printed circuit board may control the visual output through the color filter.

In another example, an OLED screen has the following layers: encapsulation, cathode, electron injection layer, hole blocking layer, emissive layer, electron blocking layer, hole transport layer, hole injection layer, anode, and glass. In this example, the EGM display unit 400 may include a plurality of LEDs extending along the width of the EGM display unit 400.

The shape and size of the screen 405 may take various forms. In an example, the screen 405 may be curved, flat or other shape. The screen 405 may be rigid, or it may be flexible. The screen 405 may have a range of sizes. For example, the screen 405 may have a size of the size of about 85" in diagonal length, 74" in diagonal length, 10" in diagonal length on a hand-held device, or may take some other larger or smaller size.

In yet another example, the screen 405 may be one or more notched displays that may be pieced together, e.g., like tiled displays, to form a larger screen. Such a screen 405 may be operated as a single unit or a group of smaller displays.

The screen 405 may also include a bezel 407. The bezel 407 may be larger, smaller, or, there may be no bezel 407 at all. The size of the bezel 407 may depend on the whether the screen is to be held by a user. The bezel 407 may be smooth, textured or some combination.

Figure 4B:
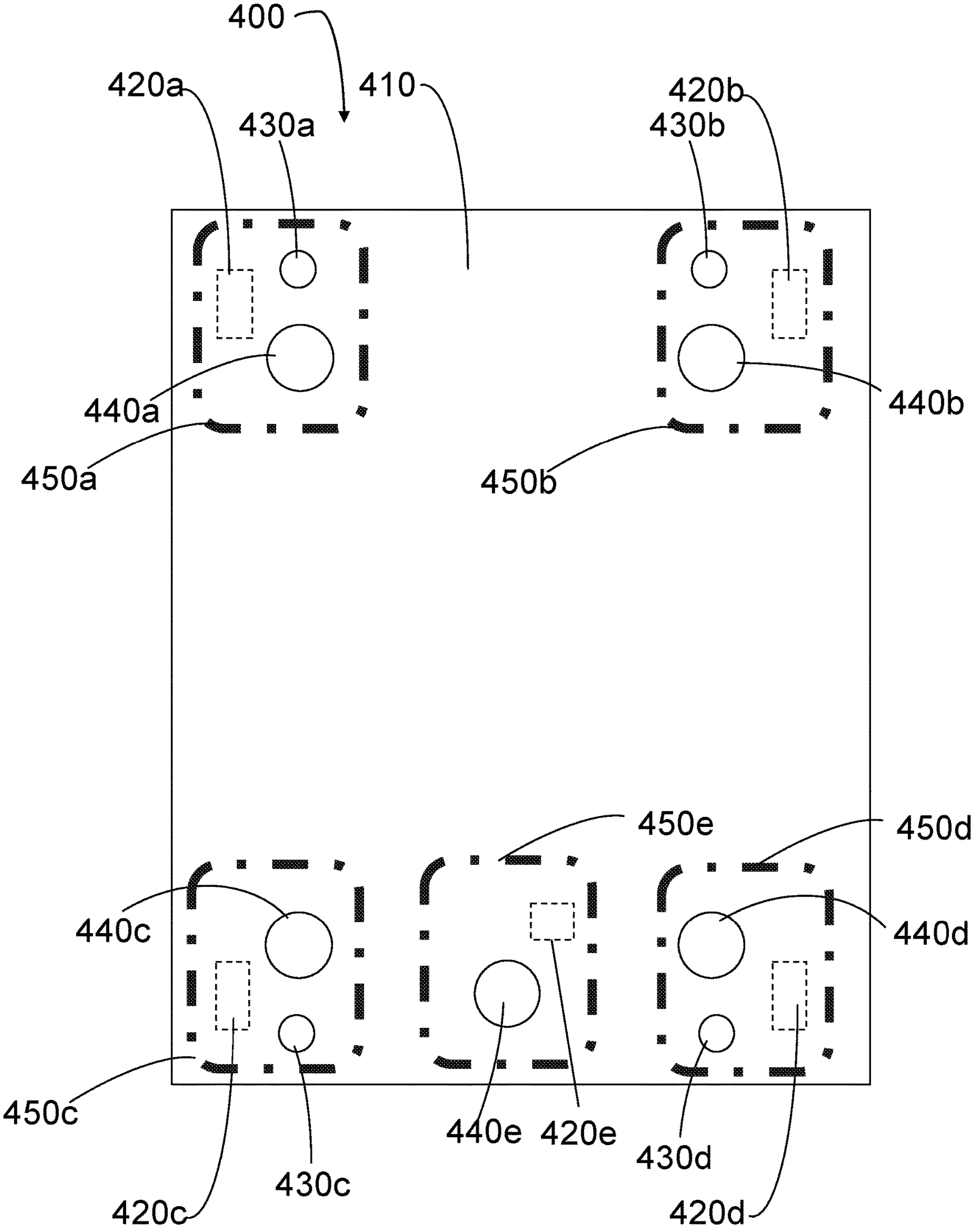
FIG. 4B depicts the inside rear surface of a screen with a five channel speaker system.

FIG. 4B illustrates an example rear panel 410 of an EGM display unit 400. In this example, the rear panel 410 may provide a housing for five channels of audio in a 5.1 surround sound system: a surround left channel 450*a*, a surround right channel 450*b*, a left channel 450*c*, a right channel 450*d*, and a center channel 450*e*. In this example:

surround left channel 450*a* comprises a tweeter transducer (or actuator) 430*a*, a full range speaker transducer 440*a*, and a speaker crossover 420*a* to prevent subwoofer frequencies from reaching the transducers 430*a* and 440*a* surround right channel 450*b* comprises a tweeter transducer (or actuator) 430*b*, a full range speaker transducer 440*b*, and a speaker crossover 420*b* to prevent subwoofer frequencies from reaching the transducers 430*b* and 440*b* left channel 450*c* comprises a tweeter transducer (or actuator) 430*c*, a full range speaker transducer 440*c*, and a speaker crossover 420*c* to prevent subwoofer frequencies from reaching the transducers 430*c* and 440*c* right channel 450*d* comprises a tweeter transducer (or actuator) 430*a*, a full range speaker transducer 440*d*, and a speaker crossover 420*d* to prevent subwoofer frequencies from reaching the transducers 430*d* and 440*d*, and center channel 450*e* comprises a full range speaker transducer 440*e*, and a speaker crossover 420*e* to prevent subwoofer frequencies from reaching the transducer and 440*e*

In this example, the two transducer channels provide a user (or listener) with a full range audio experience. In this example, full range speaker transducers 440*a-d* provide mid to low frequency sound while tweeter transducers 430*a-d* provide high frequency sound. The speaker crossovers 420*a-d* serve as filters that block out unwanted frequencies to a speaker or group of speakers and supply each driver with the signal range it was designed to best reproduce. In an example, tweeters, woofers and subs should get high, mid and low frequencies respectively.

Transducers convert energy from audio signals into mechanical energy. The energy then causes vibrations on the display panel that transform into acoustic waves that are transmitted through the air and result in sound. In an example the transducer may transmit sound to the flat surface through a small material placed within an aluminum case and wrapped in a coil. Electricity passing through the coil will cause the material to slightly expand and exert a force on the flat surface. When the flat surface vibrates, it can broadcast sound.

The arrangement illustrated in FIG. 4B is an example 5.1 surround sound system with a five channel speaker system. Stereo sound systems create a sound-field shaped like a performance stage as if the listener is sitting in a theater. Surround sound systems further add sounds to the sides and behind the listener. A full range speaker transducer 420*a*, a tweeter transducer 430*a*, and a speaker crossover 440*a* comprise channel 1, surround left 450*a* (oriented as facing the rear panel 410 of the EGM display unit 400). A full range speaker transducer 420*b*, a tweeter transducer 430*b*, and a speaker crossover 440*b* comprise channel 2 450*b*, surround right. A full range speaker transducer 420*c*, a tweeter transducer 430*c*, and a speaker crossover 440*c* comprise channel 3, the left channel 450*c*. A full range speaker transducer 420*d*, a tweeter transducer 430*d*, and a speaker crossover 440*d* comprise channel 4, the right channel 450*d*. A transducer 440*e* and the speaker crossover 420*e* comprise the center channel 450*e*. The speaker crossovers 420*a-e* prevent subwoofer frequencies from reaching the transducers 430*a-e*, 440 *a-e*. In an example, the subwoofer transducer may be in a separate unit. In an example the five-channel speaker system may be configured in five regions, with each channel 450*a-d* occupying a region, as depicted in FIG. 4B.

An EGM display unit 400 may have a five-channel speaker system and each channel may further include a speaker crossovers configured to send and receive a signal to at least one transducer 430*a-d*, 440*a-e* configured to receive a signal from a processor in the EGM display unit, wherein the signal could be digital or analog. In some examples, the at least one transducer may convert the audio energy signal to one or more mechanical sound waves by vibrating screen 405. Air is an elastic medium. When the display panel is vibrated by the transducers 430*a-d*, 440*a-e*, air molecules are pushed and pulled, making them ram in to each other in a domino effect. This wave reaches and moves the user's eardrum and sends a signal that your brain interprets as sound.

In an example there may be a sixth channel outside of the EGM display unit 400 the five channels inside the EGM display unit may work combined with the sixth channel outside the EGM display unit 400 to create an immersive sound experience.

In yet another example, the EGM display unit 400 may be operable to display an image on screen 405 and, use the screen 405 as a speaker cone to generate an audio output. With the screen 405 serving a dual purpose (display and speaker cone), dedicated speakers may not be necessary.

Each of the five channels 450*a-e* may receive independent signals and amplify sound independently or in concert. In an example, one of the channels 450*a-e* may correspond to an image being displayed in the same region on the front display surface in order to provide a directional sound cone and an immersive user experience.

While the arrangement illustrated in FIG. 4B is a 5.1 surround sound system, any conventional surround sound multi-channel audio speaker arrangement could be implemented, such as, for example, 2.0, 2.1, 3.0, 3.1, 5.0, 5.1, 5.2, 7.0, 7.1, 7.2, 9.0, 9.1, 9.1.2, 9.1.4, 9.2, and 9.2.4. The arrangement illustrated in FIG. 4D is an example 3.0 surround sound system. Where the screen is larger, an arrangement containing more channels is easier to implement. In an example, the display may act as the center speaker in a larger surround sound system. In an example, the transducers 430*a-e*, 440 *a-e* may be arranged in various surround sound speaker arrangements.

According to the example in FIG. 4B, channels 1-4 contain a tweeter transducer 430*a-d* for high frequency sounds and a full range speaker transducers 440*a-d* to capture the remaining ranges of frequencies. Alternatively, each channel may contain one full range speaker transducer functioning alone, or multiple speaker transducers in order to produce all audible frequencies (20 Hz to 20,000 Hz). Subwoofers cover the lowest frequencies; woofers cover mid-to-low-end of audible frequencies; subwoofers cover the low-end of audible frequencies; mid-range speakers cover the mid-range of audible frequencies; and tweeters cover the high end of audible frequencies.

Each channel may contain a woofer, mid-range, and tweeter transducer. In an example, the speaker transducer may be a moving-coil/electrodynamic speaker driver, magnetostatic/planar magnetic, ribbon, electrostatic, moving-iron, piezoelectric, a screw-type transducer, or magnetostrictive. In one example, the speakers may be component speakers. In another example, the speakers may be coaxial. Coaxial speakers are full-range speakers. They are typically a single unit including a woofer, tweeter, and external speaker crossover. Component speakers, on the other hand, are speakers with separate speakers for different ranges. They also include more advanced speaker crossover systems to provide better clarity and sound quality.

In an example where there are multiple transducers (also called drivers or actuators), a speaker crossovers 420*a-e* may send the audio signal to the appropriate transducer 430*a-e*, 440*a-e*.

Figure 4C:
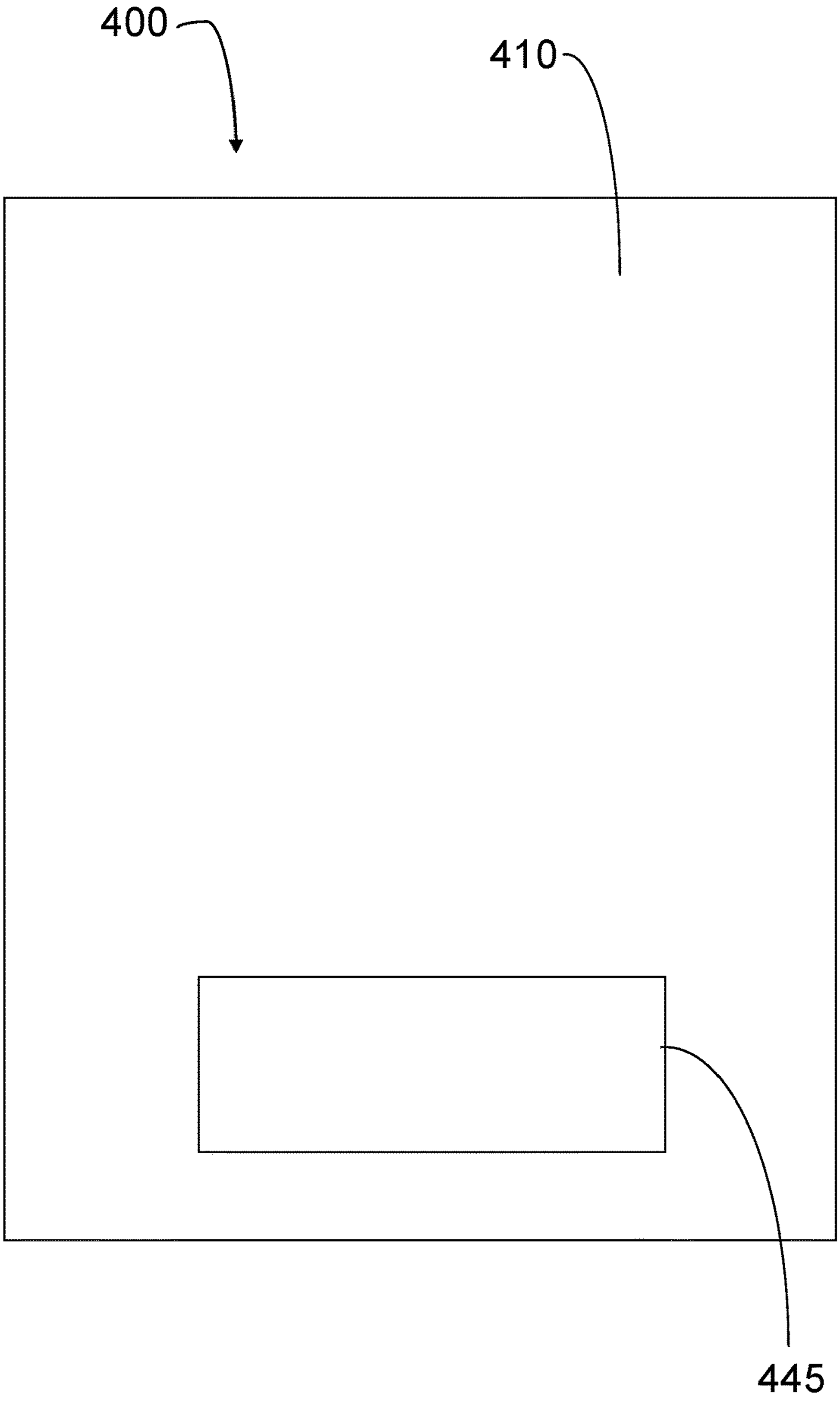
FIG. 4C depicts the rear panel of the display.
Figure 4D:
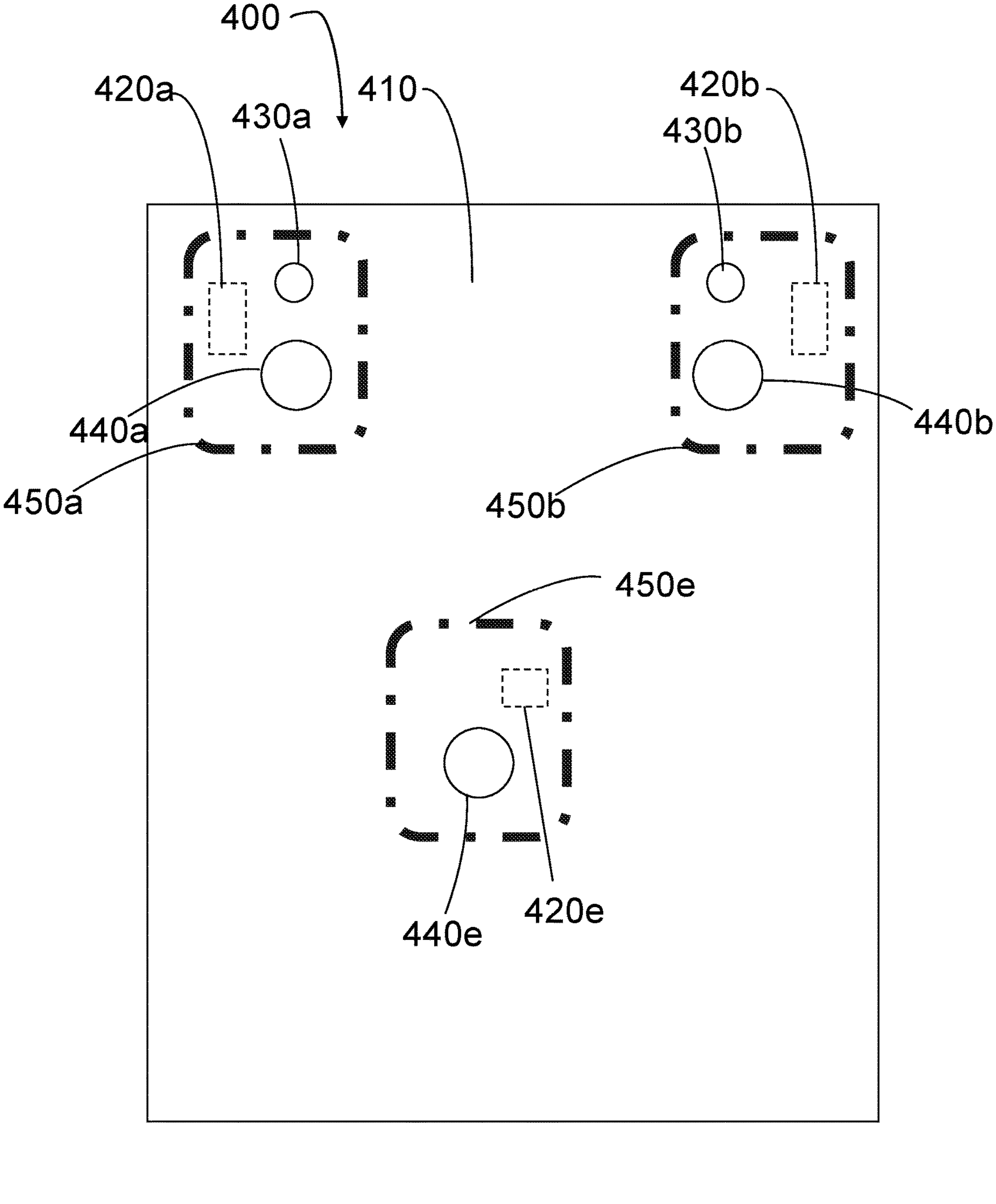
FIG. 4D depicts the inside rear surface of a screen with a three channel speaker system.

FIG. 4C illustrates a rear panel 410 on an EGM display unit 400. In an example, a conventional subwoofer 445 may be mounted on the rear panel 410 of the EGM display unit 400. In another example, the subwoofer 445 may be entirely separate from the EGM display unit 400.

Figure 4E:
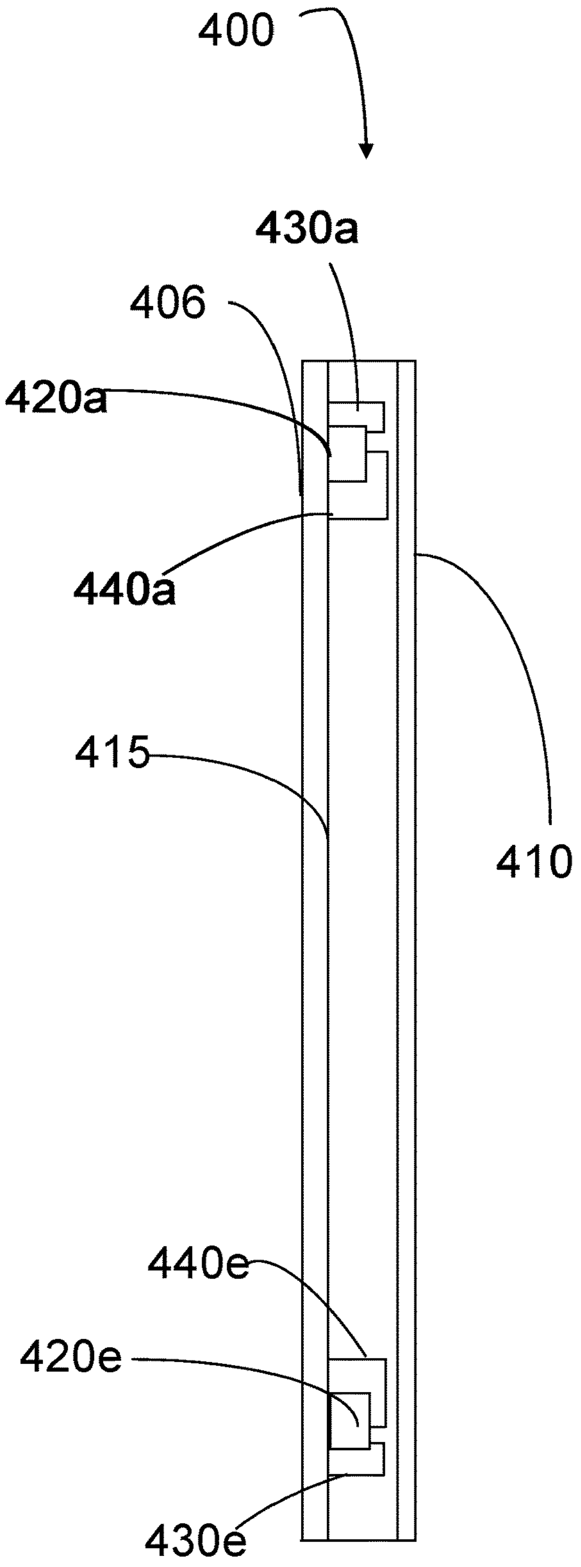
FIG. 4E depicts a side cross sectional view of a screen with a three channel speaker system showing the inner components from the left side (taken as facing the rear of the screen)

In an example, as illustrated in FIG. 4E, one or more transducers 430*a-e*, 440*a-e* may be located between the rear panel 410 and the screen 405. FIG. 4E depicts a side cross sectional view of a screen with a three channel speaker system showing the inner components from the left side (taken as facing the rear of the screen). Thus, transducers 430*a*, 440*a*, 430*c*, and 440*c* are in view. The screen 405 may serve a dual purpose of (1) displaying an image or a series of images from the front display surface 406 and (2) acting as a speaker cone to amplify sound. The speaker cone may function directionally (aimed at a particular directional field) or non-directionally (spreading naturally according to traditional sound engineering principles). In another example, one or more transducers 430*a-e*, 440*a-e* may be located outside the EGM display unit 400 with a separate speaker cone.

In some examples where the screen 405 is flexible, the one or more transducers may also be flexible. In an example, the flexible screen and the flexible one or more transducers may share a common material. In another example, a first flexible material may be employed for the flexible screen, and a second flexible material may be employed for the one or more transducers. In another example, a first material may support the flexible screen. In an example, an acoustic insulative material, or damper, may be operably engaged between the first and second flexible materials.

The EGM display unit 400 may be orientated vertically, horizontally, or in any direction and/or may be flat or curved. In an example, the screen 405 may be orientated vertically, horizontally, or in any direction and/or may be flat or curved. The speakers may be orientated in a conventional surround sound multi-channel audio speaker arrangement, such as, for example, 0.0, 2.1, 3.0, 3.1, 5.0, 5.1, 5.2, 7.0, 7.1, 7.2, 9.0, 9.1, 9.1.2, 9.1.4, 9.2, and 9.2.4.

In another example, the screen may rotate (and thus, the transducers behind it will rotate along with it).

Figure 5A:
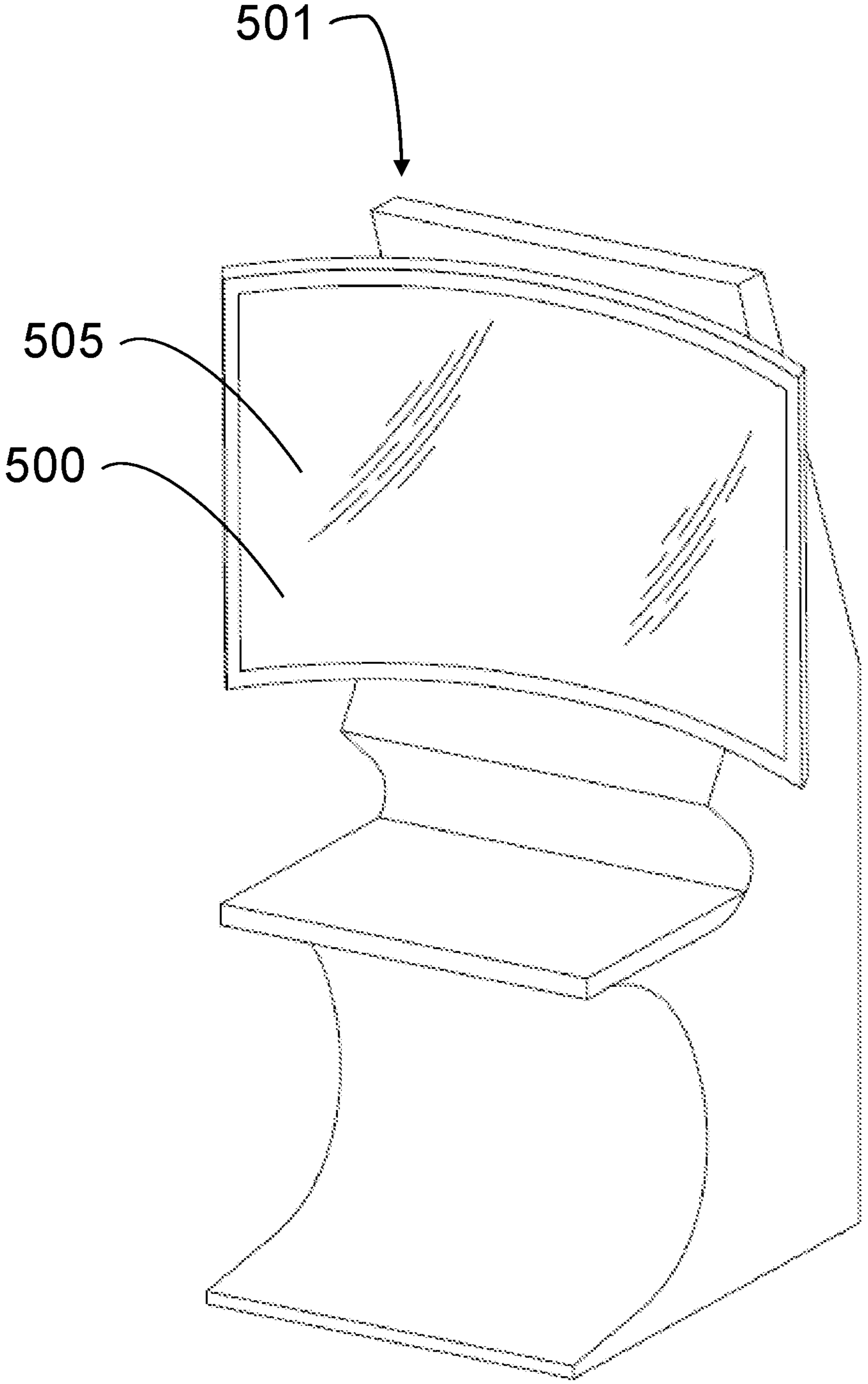
FIGS. 5A-5C depict an EGM with an EGM display unit capable of generating an audible sound according to an example described herein.
Figure 5B:
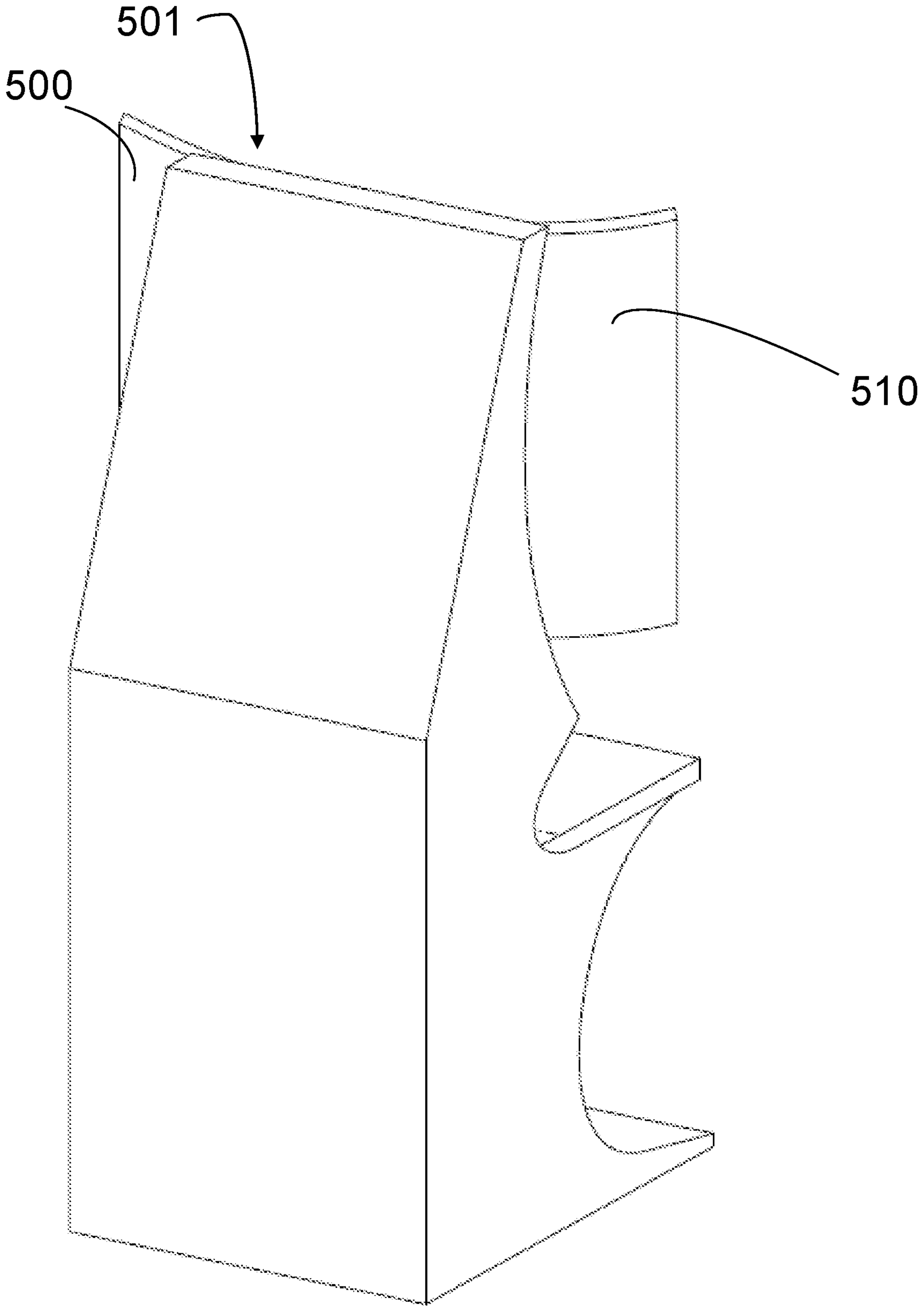
Figure 5C:
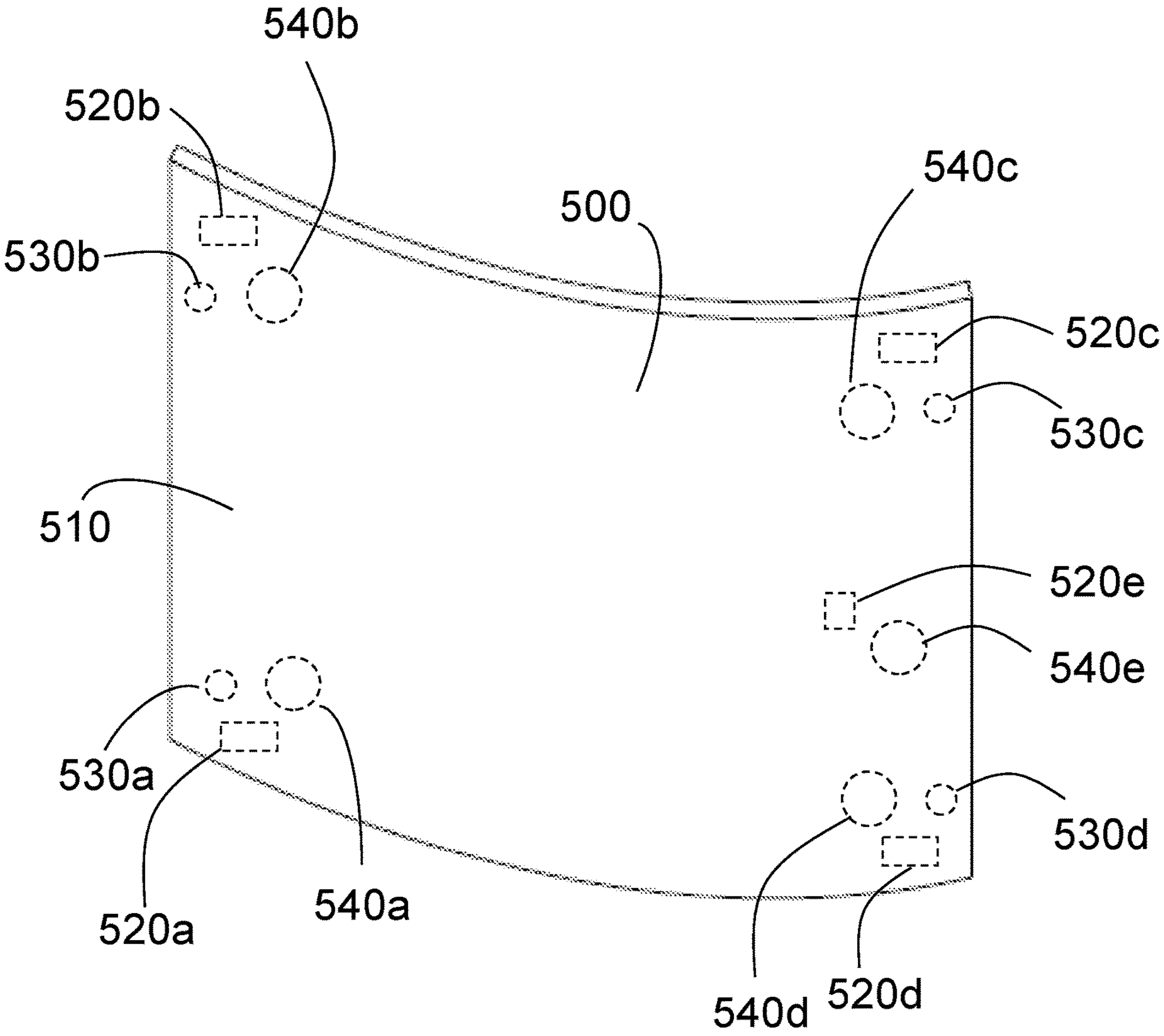

FIG. 5A illustrates, an example of an EGM 501 with a curved, horizontally orientated EGM display unit 500 and a curved screen 505. FIG. 5B illustrates a rear exterior of the EGM 501. In an example, a rear panel 510, illustrated in FIG. 5B, may house a multi-channel audio system. In the example shown in FIG. 5C the audio system components of the EGM display unit 500 may be behind the rear panel 510 and thus, may not be visible. Thus, the audio system components are illustrated in broken lines for clarity. For example, the audio system components may include: at least one speaker crossovers 520*a-e* configured to send at least one audio signal to at least one appropriate transducer 530*a-e*, 540*a-e*. Because the sound is amplified through the screen 505. Thus, regardless of the mounting structure behind it, the sound will not be impacted.

Figure 5D:
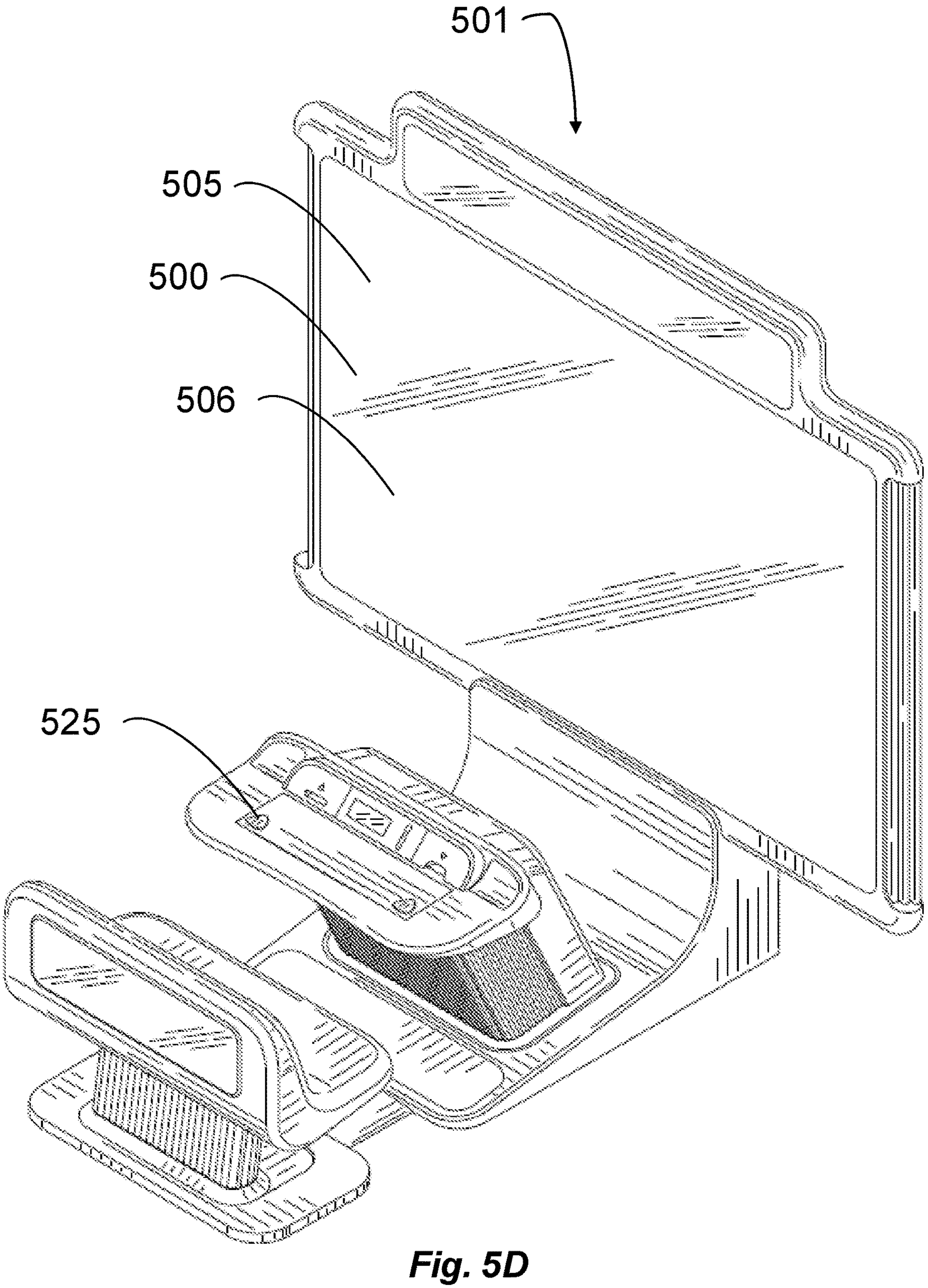
FIGS. 5D and 5E depict an EGM with an EGM display unit capable of generating an audible sound according to an example described herein.
Figure 5E:
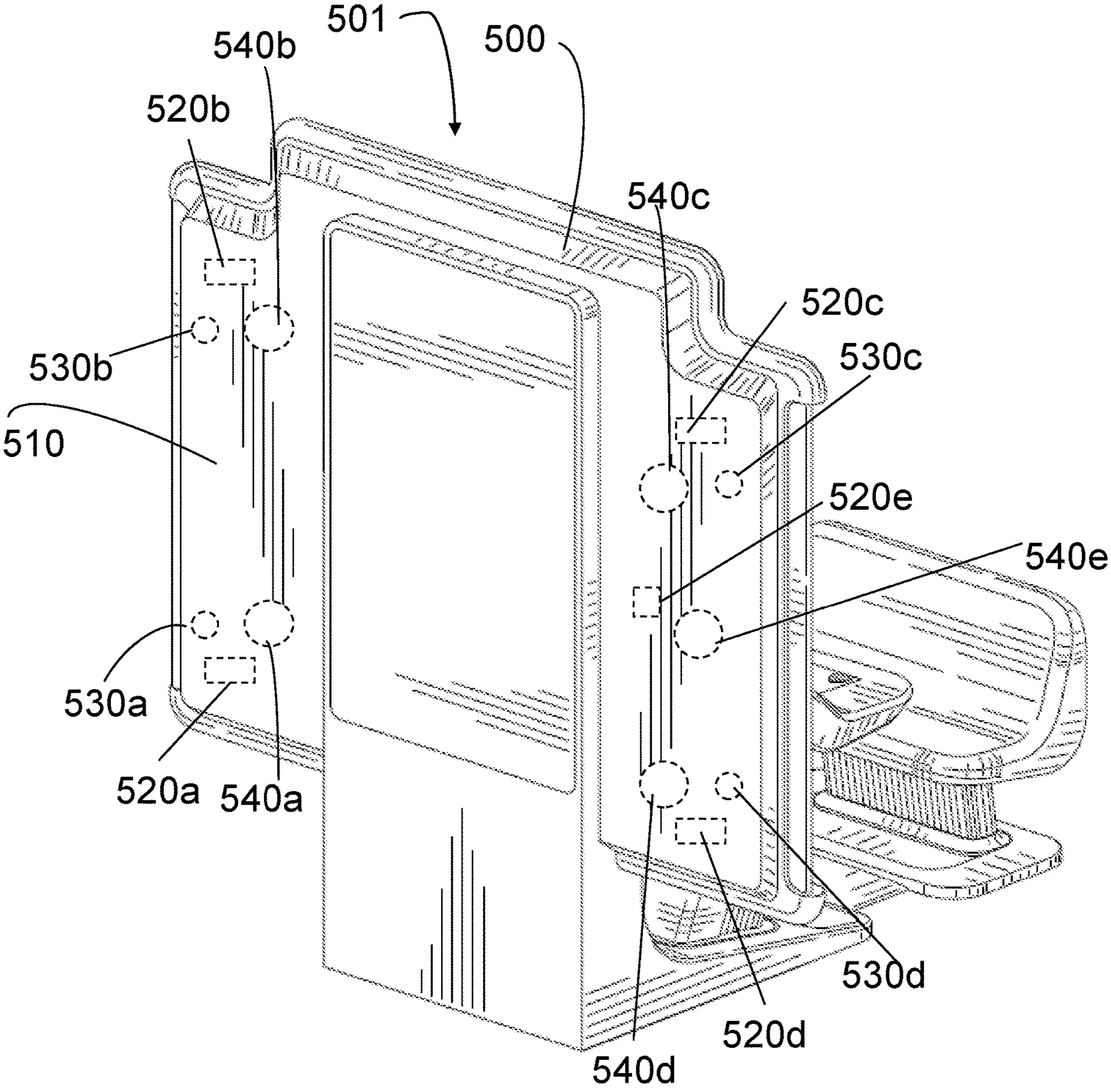

FIG. 5D illustrates, an example of an EGM 501 with a flat, horizontally orientated EGM display unit 500 and a flat screen 505. The front display surface 506 may serve a dual purpose of (1) displaying an image or a series of images and (2) acting as a speaker cone to amplify sound. The speaker cone may function directionally (aimed at a particular directional field) or non-directionally (spreading naturally according to traditional sound engineering principles). FIG. 5E illustrates the rear of the EGM 501. In an example the rear panel 510, illustrated in FIG. 5E, may house a multi-channel audio system. While in the example shown in FIG. 5E the audio system components may be behind the rear panel 510 and thus, may not be visible, the audio system components are illustrated in broken lines to represent the locations of the components within the screen. For example, the audio system components may include: at least one speaker crossover or speaker crossover 520*a-e* configured to send at least one audio signal to at least one appropriate transducer 530*a-e*, 540*a-e*.

Figure 6A:
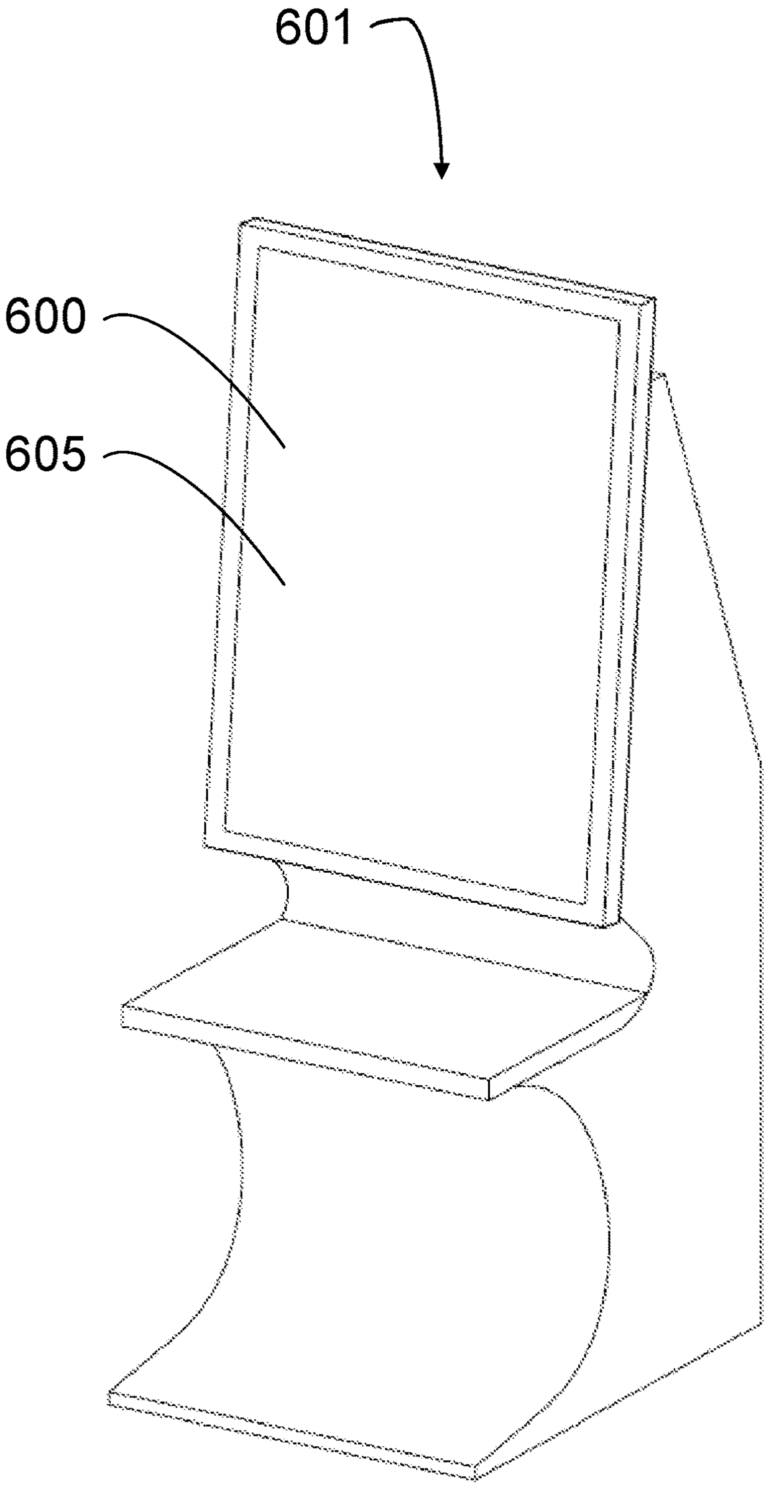
FIGS. 6A-6C depict an EGM with a screen operable to generate an audible sound according to an example described herein.
Figure 6B:
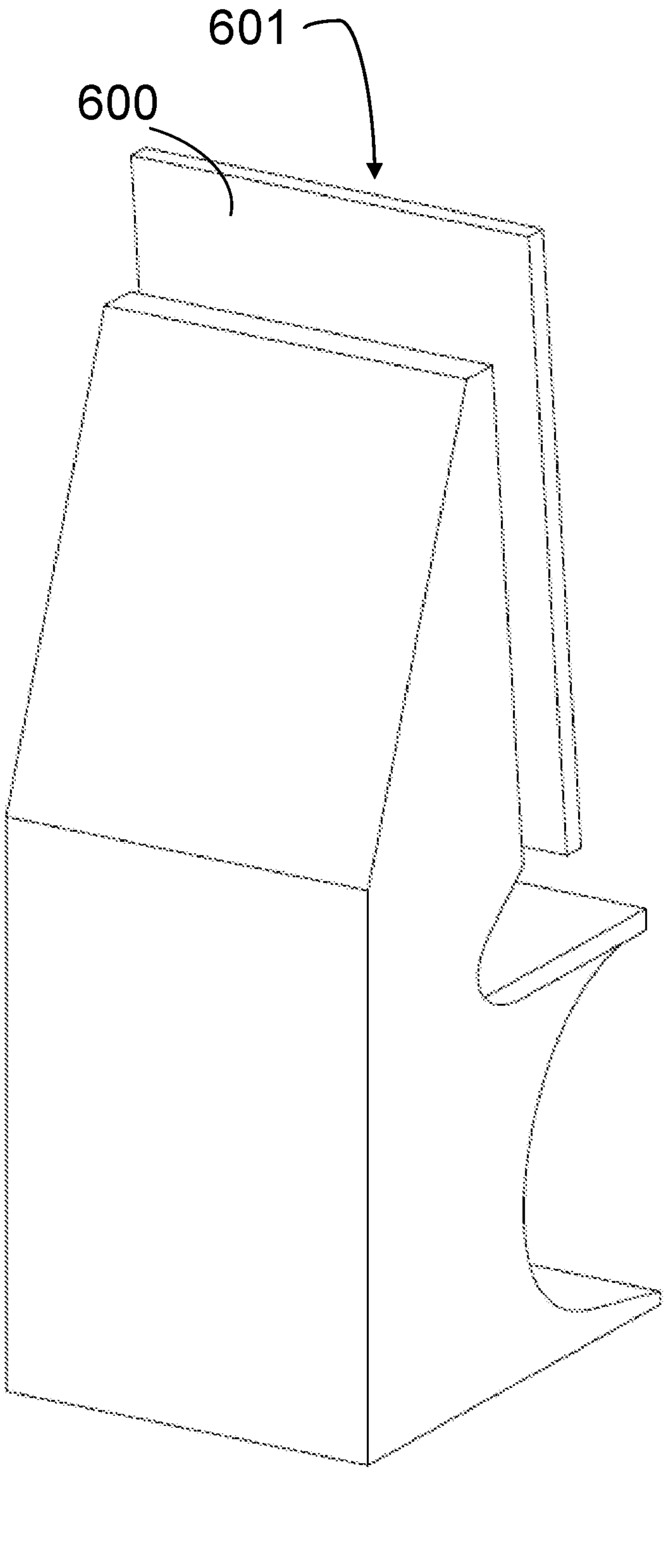
Figure 6C:
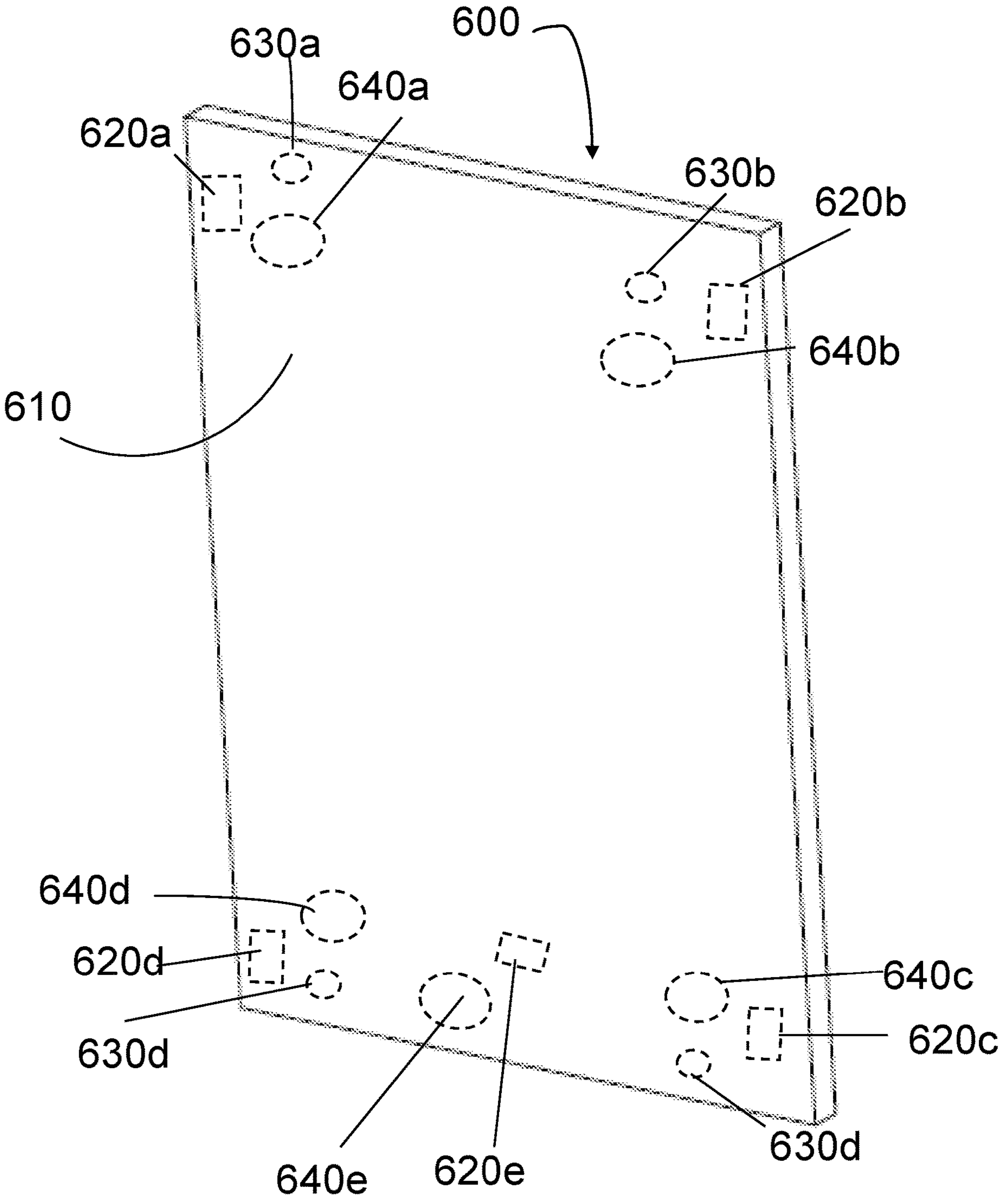

FIG. 6A illustrates, in an example of an EGM 601 flat, vertically orientated EGM Display unit 600 and a flat screen 605. FIG. 6B illustrates the rear of the EGM 601. In an example, the rear panel 610, illustrated in FIG. 6B, may house a multi-channel audio system. FIG. 6C calls out the EGM display unit 600. While the audio system components may be behind the rear panel 610 of the EGM display unit 600, and thus, may not be visible in an example shown in FIG. 6C, the audio system components are illustrated in broken lines to represent the locations of the components within the screen. For example, the audio system components may include: at least one speaker crossover 620*a-e* configured to send at least one audio signal to at least one appropriate transducer 630*a-e*, 640*a-e*. The vertical (portrait) set up may allow the screen seem to move sound around per transducer location.

Figure 6D:
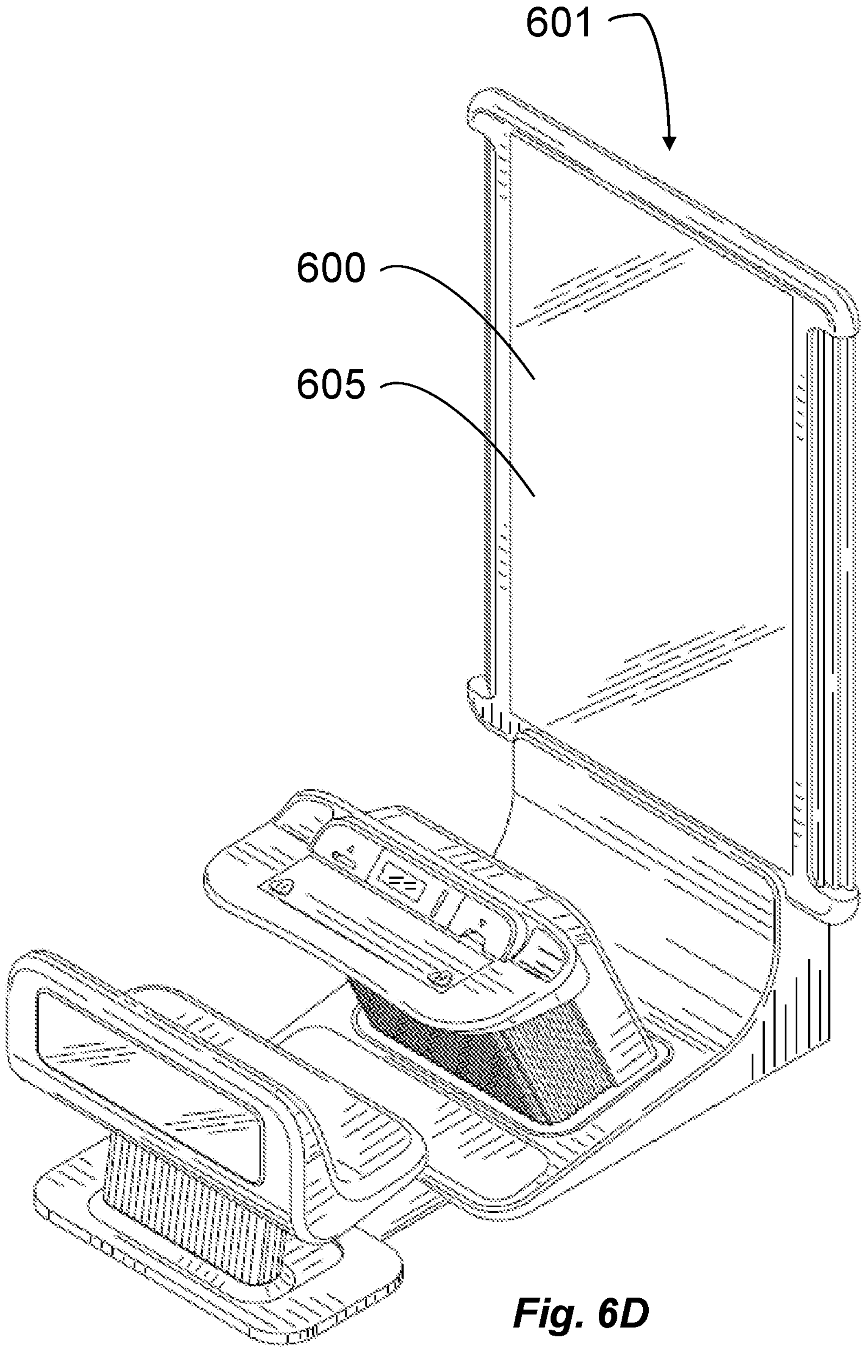
FIGS. 6D and 6E depict an EGM with an EGM display unit capable of generating an audible sound according to an example described herein.
Figure 6E:
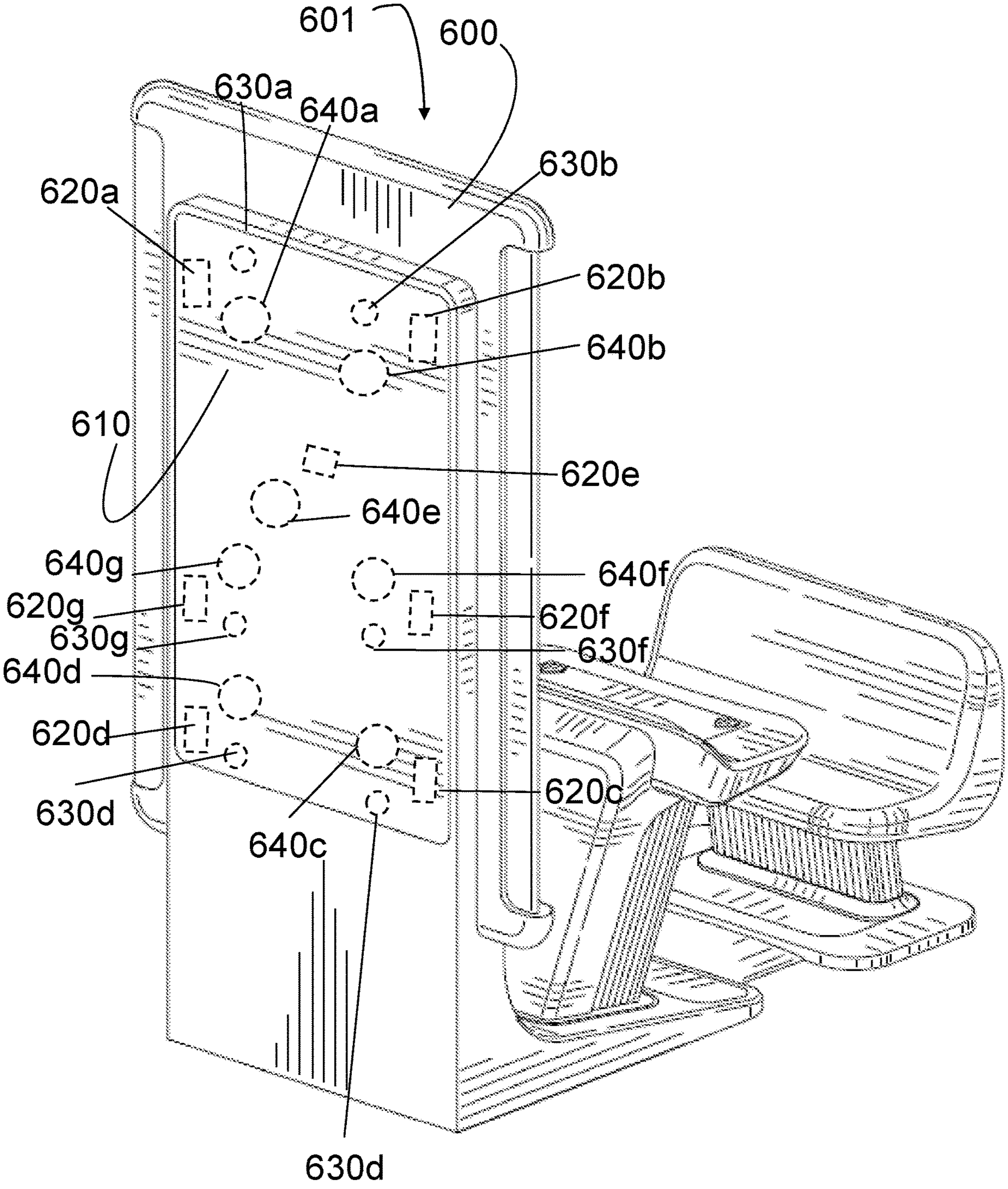

FIG. 6D illustrates, in an example of an EGM 601 vertically orientated EGM Display unit 600 and a flat screen 605. FIG. 6E illustrates the rear of the EGM 601. In an example, the rear panel 610, illustrated in FIG. 6E, may house a multi-channel audio system arranged in 6.1 surround sound. While the audio system components may be behind the rear panel 610 and thus, may not be visible in an example shown in FIG. 6E, the audio system components are illustrated in broken lines to represent the locations of the components within the screen. For example, the audio system components may include: at least one speaker crossover 620*a-g* configured to send at least one audio signal to at least one appropriate transducer 630*a-g*, 640*a-g*. The vertical (portrait) set up may allow the screen seem to move sound around per transducer location.

Figure 10:
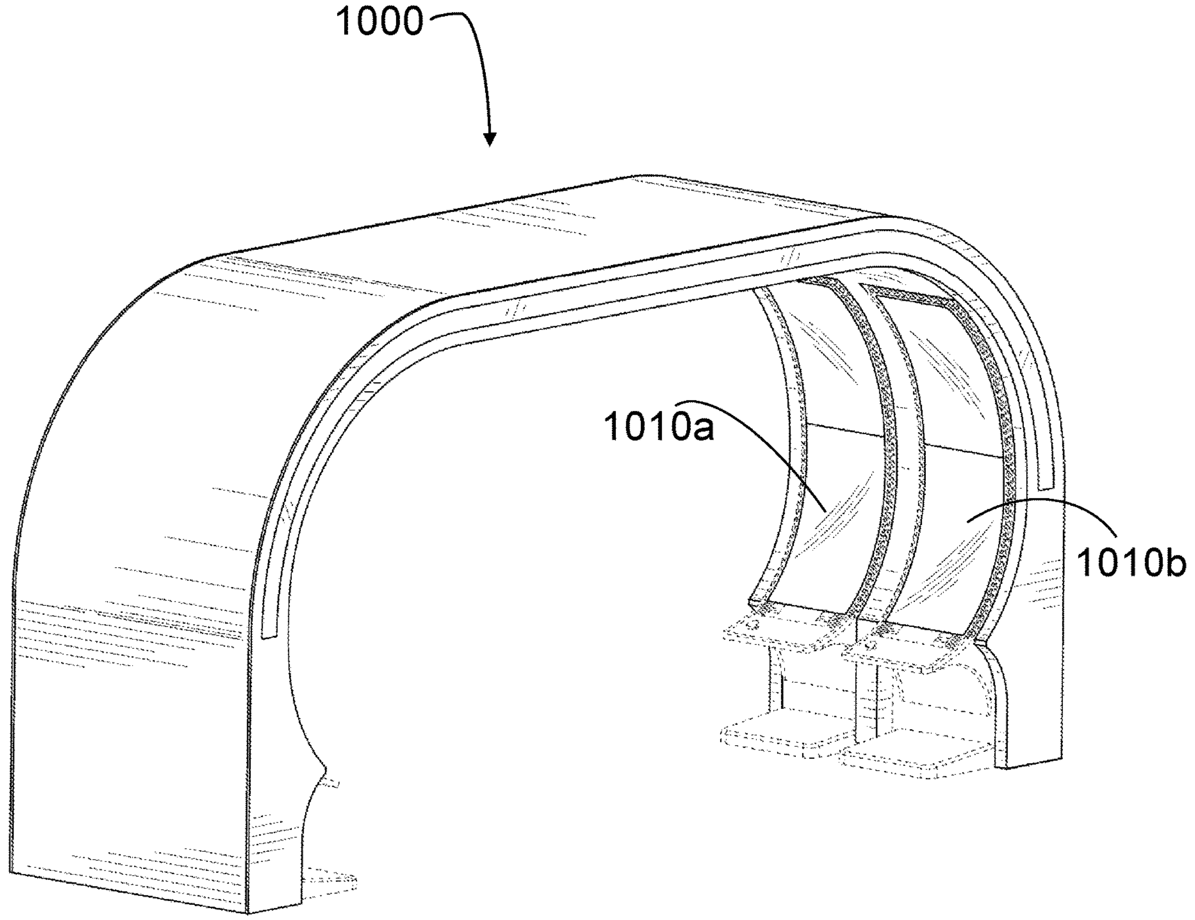
FIG. 10 depicts a 4 unit electronic gaming machine system.

In an example there may be two or more EGMs forming a bank of EGMs. There may be one or more display units configured to generate audio independently of one another. In another example, the EGM display units may generate audio together providing an immersive, 3-D sound experience, as depicted, for example, in FIG. 10. In accordance with FIG. 10, the EGM system 1000 may consist of up to four EGMs 1010*a*, 1010*b*.

Figure 9:
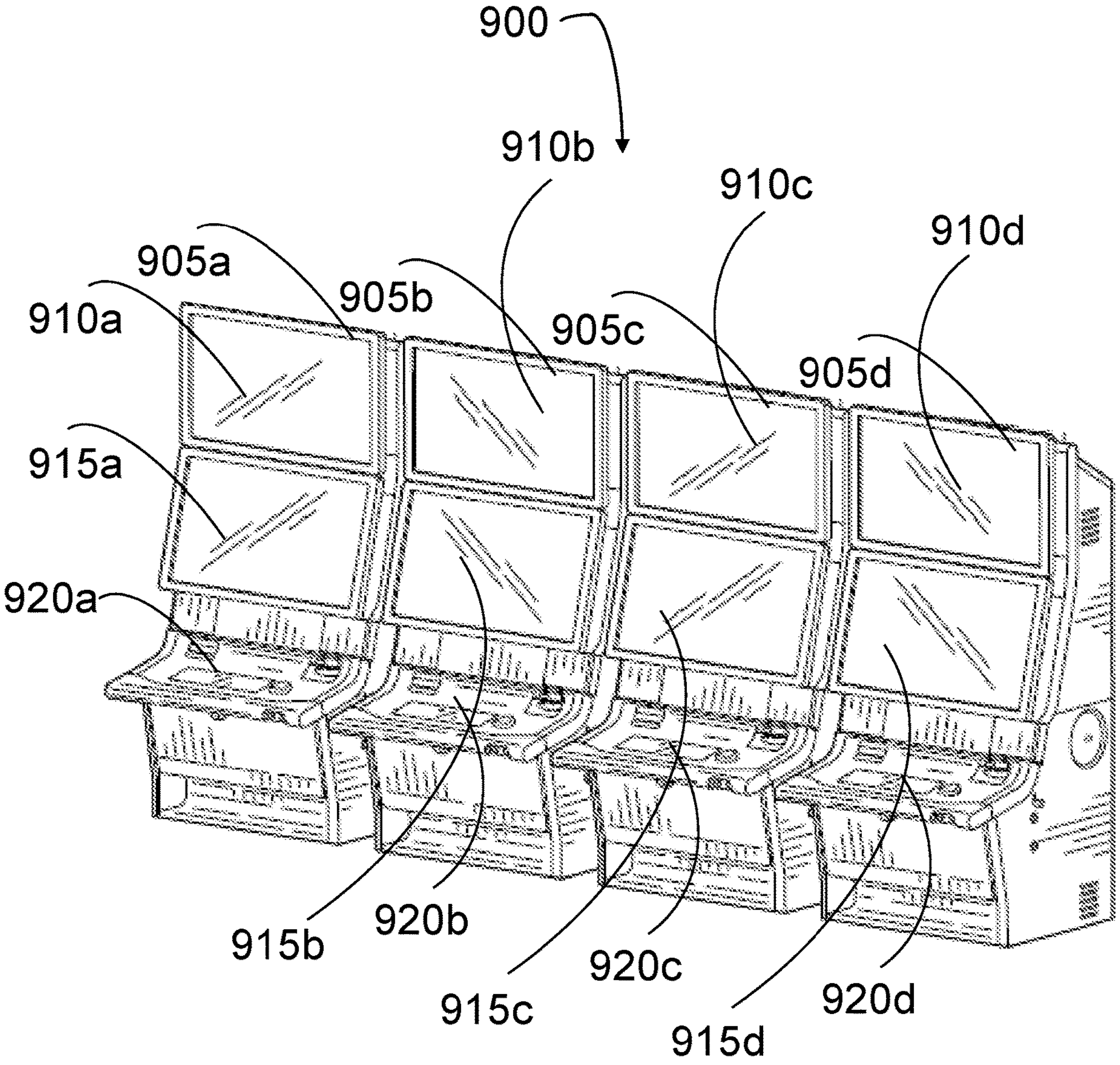
FIG. 9 depicts a 4 unit electronic gaming machine system.

In accordance with FIG. 9, there may be four EGMs 905*a-d* forming an EGM system 900. In some embodiments, the EGMs 905*a-d* may be adjacent to one another along a line. Each EGM 605*a-d* may have two screens 910*a-d*, 915*a-d*, one being an upper display 910*a-d* and one being a lower screen 915*a-d*. Each EGM 905*a-d* may have a button deck 920*a-d*. In an example, the EGM system may comprise at least two electronic gaming machines each having at least one screen with a front display surface and a rear surface 415; and a rear panel 410; wherein at least one transducer is connected to the rear surface 415 of the screen and is operable (by exerting a force on the rear surface 415 of the screen 405) to vibrate the screen to generate and amplify at least one mechanical sound wave; and the at least two electronic gaming machines each further having a button deck configured to receive inputs based on at least one user action; and at least one processor, wherein the at least one processor is configured to process user inputs from any or both of the at least two electronic gaming machines and produce an instruction to any of the at least one transducers to vibrate the screen to generate and amplify at least one mechanical sound wave.

An EGM in the EGM system may have a display positioned upright. In another example, an EGM in the EGM system may be positioned substantially horizontal with respect to the ground in a table-top shape.

Figure 7:
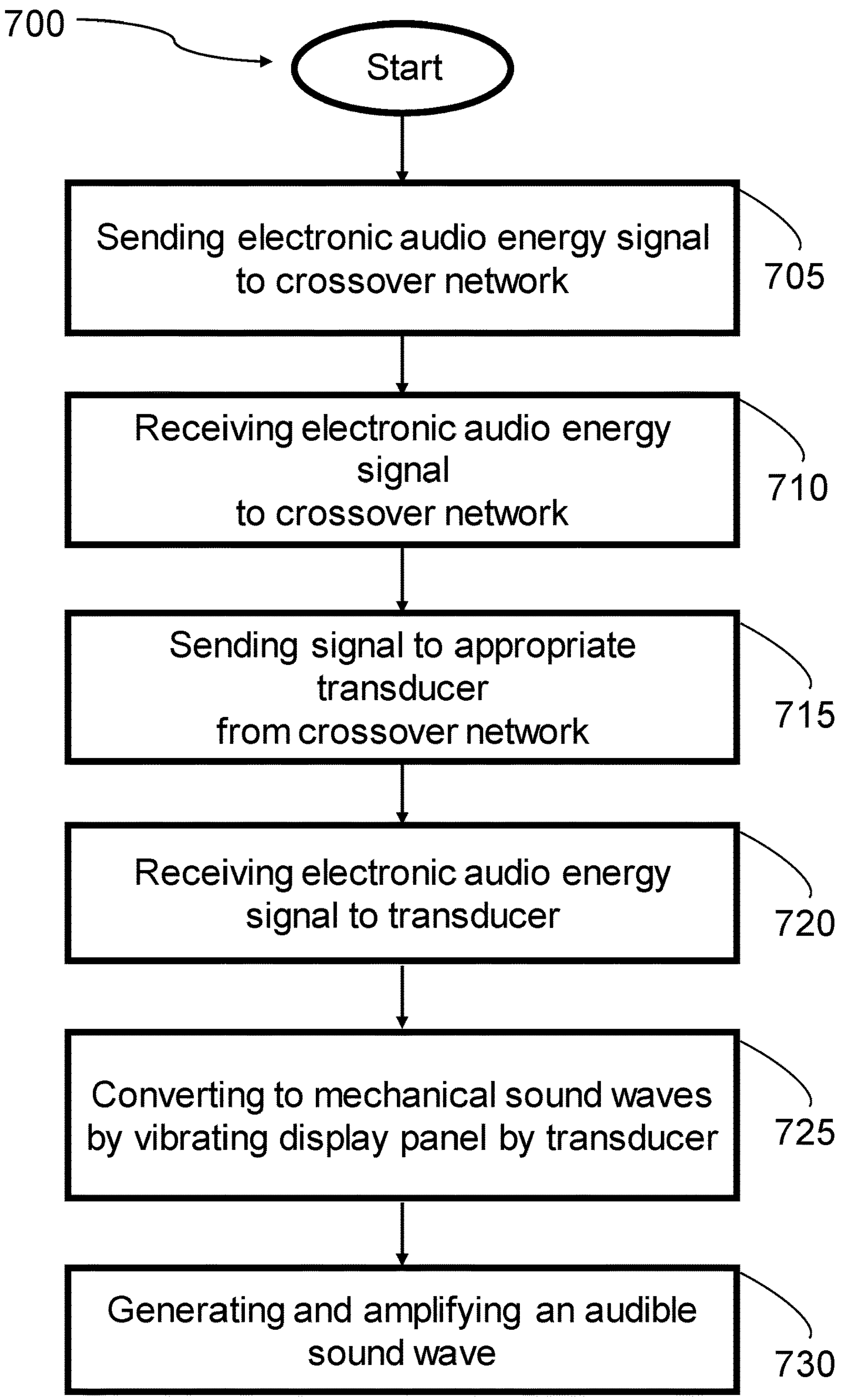
FIG. 7 illustrates a process flow diagram describing how an audio signal generates an audible soundwave in accordance with various implementations described herein.

In accordance with FIG. 7, an example method 700 is disclosed for generating sound through a transducer behind a display. The method 700 may include sending 705 an audio energy signal to a speaker crossover and the speaker crossover receiving 710 the audio energy signal. The method 700 may further include the speaker crossover sending 715 the signal to the appropriate transducer. In an example, there may be different transducers for different frequencies as described herein. Alternatively, in another example there may be one transducer covering a full range of frequencies. The method 700 may further include the transducer receiving 720 the audio energy signal and converting 725 it to a mechanical sound wave by vibrating the display panel, and then generating and amplifying an audible sound wave 730.

Figure 8:
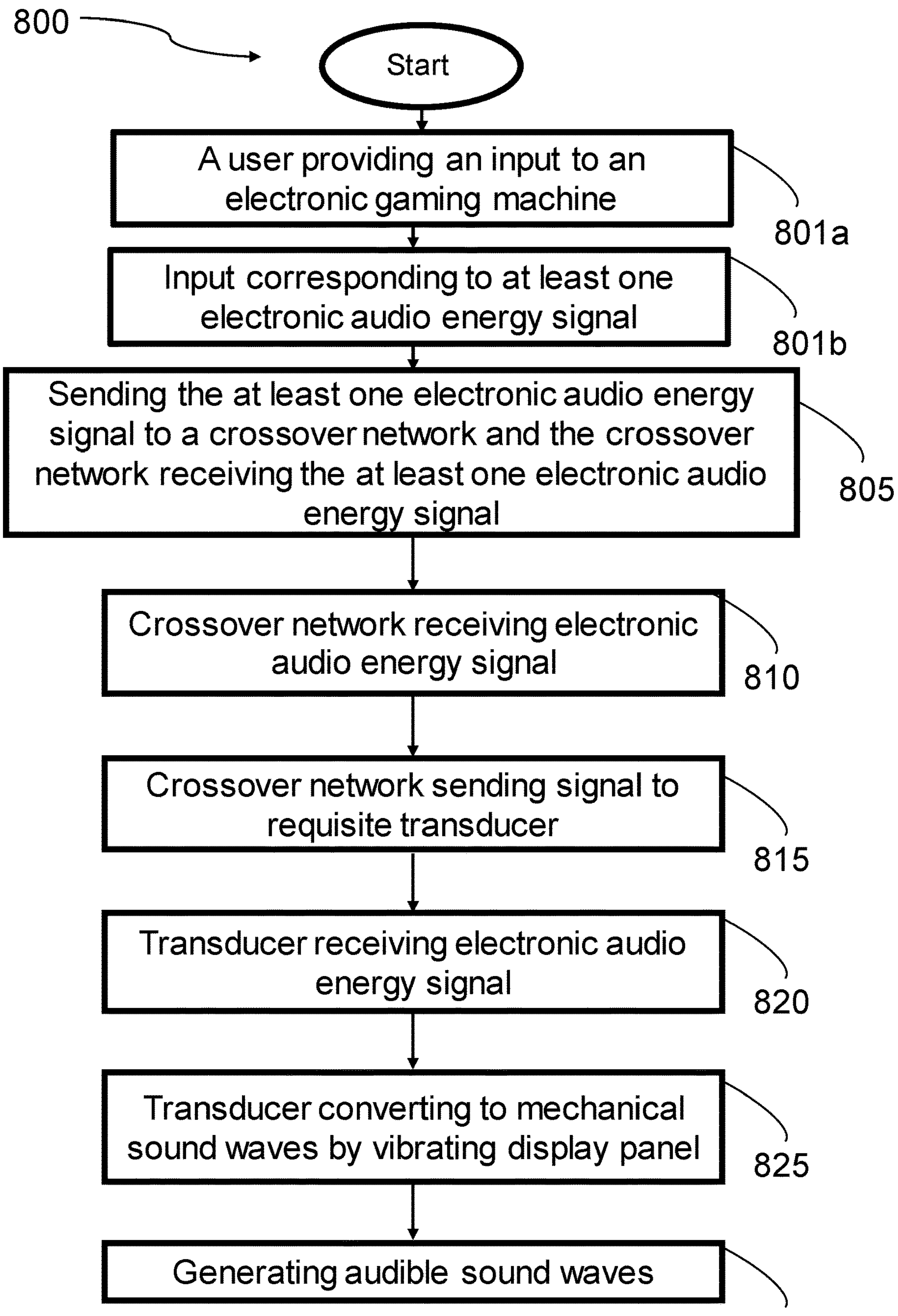
FIG. 8 illustrates a process flow diagram describing how a user input can result in generation of an audible soundwave in accordance with various implementations described herein.

In accordance with FIG. 8, an example method 800 is disclosed for generating sound through a transducer behind a display based on user inputs. The method 800 may include 801*a* a user providing an input to an electronic gaming machine and the input corresponding to at least one audio energy signal 801*b*. The method 800 may further include sending 805 an audio energy signal to a speaker crossover and the speaker crossover receiving 810 the audio energy signal. The method 800 may further include the speaker crossover sending 815 the signal to the appropriate transducer. In an example, there may be different transducers for different frequencies as described herein. Alternatively, in another example there may be one transducer covering a full range of frequencies. The method 800 may further include the transducer receiving 820 the audio energy signal and converting 825 it to a mechanical sound wave by vibrating the display panel, and then generating and amplifying an audible sound wave 830. In an example, the user input may be selection of an award. In an example, the resulting audible sound waves may sound as a song portraying success in the game. In an example, the front display surface may display an image or series of images corresponding to the sound waves.

In an example, there may be sound control and assignment system configured to control the location, range, and volume of sound generated by the display unit. In an example, the sound control system may be wired into the transducer. In another example, the control may be wireless or mobile. The control system may be configured to tune the one or more transducers through adjustments. In an example, there may be one printed circuit board to control the audio output and a separate dedicated printed circuit board to control the visual output. In an example, the display unit may include a sound control and assignment system configured to assign particular sounds and particular volumes to particular locations on the display corresponding to the images being displayed.

In another example, the volume of a sound and/or the location of the sound source may correspond to an image on the display. In an example, the volume and/or the location of a sound may correspond to a particular location on the screen that user has interacted with. In an example, the user may interact with the display through, for example, touching the screen in a particular icon/location, clicking an icon/location, gazing at a particular icon/location, or otherwise engaging with the display. In another example, the volume and/or location of a sound may correspond to the location of and/or type of icon, character, or motion on the screen.

In yet another example, there may be a change in what is displayed simultaneously at a particular location from which sound is generated. Consider an example where a rocket takes off from the bottom of the screen and moves upward vertically. The transducers behind the portions of the screen showing the rocket may generate sound and then cease to generate sound when no longer displaying the rocket such that as the rocket is displayed moving from the bottom to the top of the screen the sound of the rocket follows and corresponds with what is shown on the screen.

In another example, consider an airplane flying from the left-hand side to the right-hand side of the screen. In some examples, the transducers located behind the zones of screen showing the airplane may generate sound as the airplane is displayed in front of those transducers and may cease to generate sound as the airplane is no long displayed in those locations.

In yet another example, also consider a character shaking an open bag of coins and tossing it into the air. The transducers located behind the zones of screen showing the bag as it moves through the air may generate a sound associated with shuffling coins. Coins may be displayed as falling to the ground, and the transducers behind the zones of the screen corresponding to each location where a coin falls, may generate a sound as the screen displays each coin hitting the ground.

Consider a further example, where a screen displays a roulette wheel and ball in motion. As the roulette ball passes through the area of deflectors and into any one of the numbered pockets on the wheel, the transducers behind the displayed ball may generate a sound and cease to generate a sound, appearing to follow the ball's movement as displayed.

In an example, the sound volume may correspond to what is displayed. Consider an example where a virtually displayed slot machine is first spun aggressively by a user, and second spun gently by a user. In some examples, the sounds generated by the transducers may be louder in the first instance than in the second. In another example, the sound volume may correspond to the visual distance displayed on the screen in, for example, a 3-D display. For example, where two barking dogs are displayed, and the first dog is displayed closer to the user, while the second dog is displayed farther in the distance, the sound volume generated by the transducers behind the display of the first (closer) dog may be louder than the sound volume generated by the transducers behind the display of the second (farther) dog.

The sound range may correspond to what is displayed. Consider an example where a character yells within a square room with a doorway. In some examples, the range of sound may be substantially rectangular and extend outside of the doorway.

In an example, there may be one or more transducers 440*a-e* arranged to occupy particular locations behind the screen 405 corresponding to visually displayed elements such as symbols on virtually displayed slot machine reels.

In an example, an electronic gaming machine display unit may comprise a screen 405 with housing comprising a front display surface 406 operable to display an image from said electronic gaming machine display unit 400; and a rear surface 415; and at least one channel (for example, 450*a*, 450*b*, 450*c*, 450*d*, and/or 450*e*), wherein the at least one channel comprises at least one transducer (for example, 430*a*, 440*a*, 430*b*, 440*b*, 430*c*, 440*c*, 430*d*, 440*d*, 430*e*, 440*e*) connected to the rear surface 415 of the screen 405, wherein the transducer is operable to vibrate the screen and the screen vibration amplifies at least one mechanical sound wave in a sound cone directed at a player space. In an example the screen 405 may be a liquid-crystal display screen (LCD) screen, an organic light-emitting diode screen 405 (OLED) screen, or some other type of screen. The screen may be curved 505, substantially flat or flat 405, horizontal 505, vertical 405, or in some other orientation. The screen may be a touch enabled screen, the EGM 501 may include a button deck 525, or there may be some other way whereby a user may interact with the EGM 501.

In another example, the EGM unit may further comprise a speaker crossover (for example, 420*a*, 420*b*, 420*c*, 420*d*, 420*e*, 420*e*), a processor operable to send a signal to the speaker crossover; and a five channel speaker system (for example, 450*a*, 450*b*, 450*c*, 450*d*, 450*e*), wherein each of channels one through five includes: a tweeter transducer (430*a*, 430*b*, 430*c*, 430*d*); a full range transducer (for example, 440*a*, 440*b*, 440*c*, 440*d*, 440*e*); a speaker crossover operable to send and receive an electronic signal or analog signal and prevent subwoofer frequencies from reaching the transducers, wherein the tweeter transducer and full range transducers are operable to receive a signal from the speaker crossover; and wherein the tweeter and full range transducers are operable to vibrate the screen 405 to amplify at least one mechanical sound wave.

In an example each channel may amplify at least one mechanical sound wave independently of each of the other channels (for example, 450*a*, 450*b*, 450*c*, 450*d*, 450*e*) of the five channel speaker system.

In an example, the five channel speaker system occupies each of five adjacent regions (for example, 450*a*, 450*b*, 450*c*, 450*d*, 450*e*), wherein a first adjacent region is adjacent to a second adjacent region and opposite to the second adjacent region along a first centerline; the second adjacent region is adjacent to a third adjacent region and opposite the third adjacent region along a second centerline which is substantially perpendicular to the first centerline; the third adjacent region is adjacent to the fourth adjacent region; the fourth adjacent region is adjacent to a fifth adjacent region; and the fifth adjacent region is adjacent to the first region and opposite the first region along the second centerline. In an example EGM display unit may be one wherein each of the five channel speaker system amplifies at least one mechanical sound wave independently of each of the other five channels and wherein at least one adjacent region occupying an active channel corresponds to an image being displayed on the front display surface 406 to provide a directional sound cone.

An EGM system (for example, 900) may comprise at least two electronic gaming machines, each of the at least two gaming machines comprising at least one screen with front display surface and a rear surface 415, and a button deck operable to receive inputs based on at least one user action; at least one transducer operably connected to the rear surface 415 of the at least one screen; a controller comprising a processor and a memory, the memory storing a sound file and instructions, the instructions, which, when executed, cause the processor to execute at least: receive a user input from any or both of the at least two electronic gaming machines, and in response to receiving the user input, generate a signal corresponding to the sound file to control at least one of the transducers to vibrate the screen to generate and amplify at least one mechanical sound wave. In an example, the surface may be small.

An EGM system (for example, 900) may have at least two gaming machines wherein the at least two gaming machines may receive user inputs from either or both of at least two button decks 920*a*, 920*b* and the at least two screens 915*a*, 915*b*. In another example, an EGM gaming system 900 may have four gaming machines. At least one of the at least two gaming machines may have a screen positioned horizontally or substantially horizontal with respect to a surface of ground. In another example, an at least one of the at least two gaming machines may have a screen positioned vertically or substantially vertically with respect to a surface of ground. In yet another example, the EGM system may have four gaming machines wherein each of the four gaming machines are arranged adjacent to one another along a line.

Figure 11:
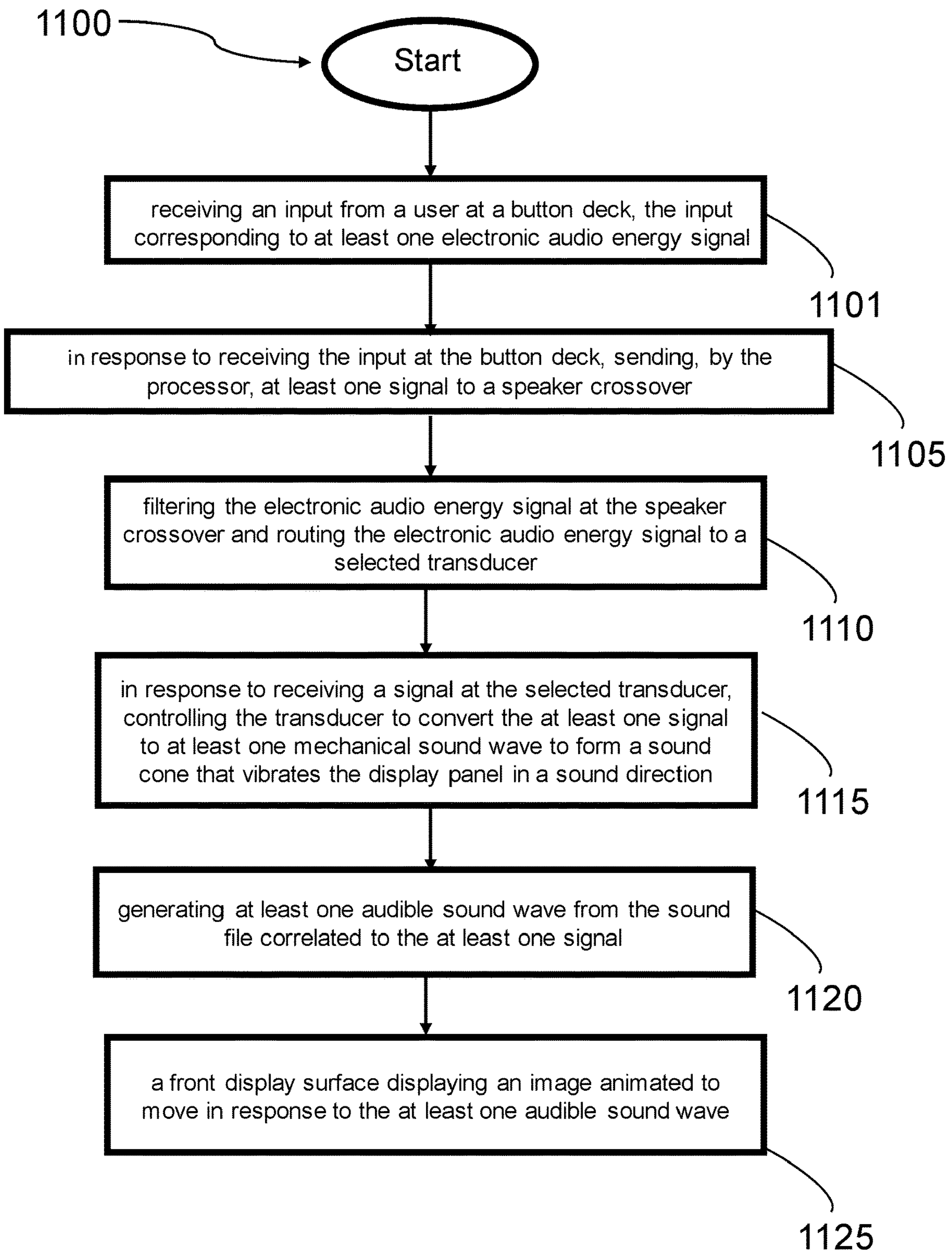
FIG. 11 illustrates a process flow diagram describing how an EGM display unit may generate an audible sound wave.

In an example in accordance with FIG. 11, a method for controlling a sound directive sound system for an electronic gaming machine, the electronic gaming machine comprising a display panel and a controller comprising a processor and a memory, the memory storing a sound file and instructions, the instructions, which, when executed, may cause the processor to execute at least the steps of: receiving an input from a user at a button deck, the input corresponding to at least one electronic audio energy signal 1101; in response to receiving the input at the button deck, sending, by the processor, at least one signal to a speaker crossover 1105; filtering the electronic audio energy signal at the speaker crossover and routing the electronic audio energy signal to a selected transducer 1110; in response to receiving a signal at the selected transducer, controlling the transducer to convert the at least one signal to at least one mechanical sound wave to form a sound cone that vibrates the display panel in a sound direction 1115; and generating at least one audible sound wave from the sound file correlated to the at least one signal 1120. In an example, the input may be the user selecting an award and wherein the at least one audible sound wave is amplified in the form of a song. The method may further comprise a front display surface displaying an image animated to move in response to the at least one audible sound wave 1125. The audible sound wave may be generated in a directional sound cone in the direction of the user.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

The invention claimed is:

1. An electronic gaming machine display unit comprising:

a screen comprising a front display surface operable to display an image from the electronic gaming machine display unit, and a rear surface; and speaker apparatus comprising at least one channel comprising a speaker crossover and at least one transducer connected to the rear surface of the screen, wherein the at least one transducer is coupled to the speaker crossover to receive at least one signal associated with an electronic gaming machine controller to generate at least one mechanical sound wave capable of vibrating the screen.

2. The electronic gaming machine display unit of claim 1, wherein the screen is a liquid-crystal display screen.

3. The electronic gaming machine display unit of claim 1, wherein the screen is an organic light-emitting diode screen.

4. The electronic gaming machine display unit of claim 1, wherein the screen is curved.

5. The electronic gaming machine display unit of claim 1, wherein the screen is substantially flat.

6. The electronic gaming machine display unit of claim 1, wherein the screen is a touch enabled screen.

7. The electronic gaming machine display unit of claim 1, comprising:

a five channel speaker system comprising the speaker apparatus.

8. The electronic gaming machine display unit of claim 7, wherein each channel of the five channel speaker system is configured to amplify at least one mechanical sound wave independently of other channels of the five channel speaker system.

9. The electronic gaming machine display unit of claim 7, wherein each channel of the five channel speaker system occupies each of five adjacent regions, wherein:

a first adjacent region is adjacent to a second adjacent region and opposite to the second adjacent region along a first centerline, the second adjacent region is adjacent to a third adjacent region and opposite the third adjacent region along a second centerline which is substantially perpendicular to the first centerline, the third adjacent region is adjacent to a fourth adjacent region, the fourth adjacent region is adjacent to a fifth adjacent region, and the fifth adjacent region is adjacent to the first adjacent region and opposite the first adjacent region along the second centerline.

10. The electronic gaming machine display unit of claim 9, wherein at least one adjacent region occupying an active channel corresponds to an image displayable on the front display surface.

11. A method for controlling a sound directive sound system for an electronic gaming machine, the electronic gaming machine comprising a display panel and a controller comprising a processor and a memory, the memory storing a sound file and instructions, the instructions, which, when executed, cause the processor to execute at least the steps of:

receiving an input from a user at a button deck, the input corresponding to an electronic audio energy signal;

in response to receiving the input at the button deck, sending, by the processor, at least one signal to a speaker crossover;

filtering the electronic audio energy signal at the speaker crossover and routing the electronic audio energy signal to a selected transducer;

in response to receiving a signal at the selected transducer, controlling the transducer to convert the electronic audio energy signal to at least one mechanical sound wave to form a sound cone that vibrates the display panel in a sound direction; and generating at least one audible sound wave from the sound file correlated to the at least one signal.

12. The method of claim 11 wherein the input comprises a selection of an award and wherein the at least one audible sound wave is amplified in the form of a song.

13. The method of claim 11 further comprising animating an image on the display panel in response to the at least one audible sound wave.

14. The method of claim 11 wherein the audible sound wave is generated in a directional sound cone in the sound direction.

15. An electronic gaming machine comprising:

a button deck operable to receive input;

a controller comprising one or more processors and one or more memories, the controller configured to output one or more control signals;

a screen comprising a front display surface operable to display an image associated with the one or more control signals, and a rear surface; and speaker apparatus comprising at least one channel comprising a speaker crossover and at least one transducer connected to the rear surface of the screen, wherein the at least one transducer is coupled to the speaker crossover to receive at least one transducer signal associated with the one or more control signals to generate at least one mechanical sound wave capable of vibrating the screen.

16. The electronic gaming machine of claim 15, wherein the screen is curved.

17. The electronic gaming machine of claim 15, wherein the screen is substantially flat.

18. The electronic gaming machine of claim 15, wherein the screen is a touch enabled screen.

19. The electronic gaming machine of claim 15, comprising:

a five channel speaker system comprising the speaker apparatus.

20. The electronic gaming machine of claim 19, wherein each channel of the five channel speaker system is configured to amplify at least one mechanical sound wave independently of other channels of the five channel speaker system.

* * * * *